(12) United States Patent
Singh et al.

(10) Patent No.: US 10,878,973 B2
(45) Date of Patent: Dec. 29, 2020

(54) FLOOD AND WIND-RESISTANT VENTILATED MODULE FOR SPENT NUCLEAR FUEL STORAGE

(71) Applicant: Holtec International, Camden, NJ (US)

(72) Inventors: Krishna P. Singh, Hobe Sound, FL (US); Paul Stefan Anton, Southampton, NJ (US)

(73) Assignee: Holtec International

( * ) Notice: Subject to any disclaimer, the term of this patent is extended or adjusted under 35 U.S.C. 154(b) by 157 days.

(21) Appl. No.: 16/568,078

(22) Filed: Sep. 11, 2019

(65) Prior Publication Data

US 2020/0082953 A1 Mar. 12, 2020

Related U.S. Application Data

(60) Provisional application No. 62/729,482, filed on Sep. 11, 2018.

(51) Int. Cl.
*G21F 5/10* (2006.01)
*G21F 1/12* (2006.01)
*G21F 5/008* (2006.01)

(52) U.S. Cl.
CPC .............. *G21F 5/10* (2013.01); *G21F 1/12* (2013.01); *G21F 5/008* (2013.01)

(58) Field of Classification Search
CPC . G21F 1/12; G21F 1/125; G21F 5/008; G21F 5/10; G21C 19/00; G21C 19/04; G21C 19/06

See application file for complete search history.

(56) References Cited

U.S. PATENT DOCUMENTS

| | | |
|---|---|---|
| 4,525,324 A | 6/1985 | Spilker et al. |
| 5,862,195 A | 1/1999 | Peterson, II |
| 7,786,456 B2 * | 8/2010 | Singh ............... G21F 5/005 250/507.1 |
| 8,576,973 B2 | 11/2013 | Fantini |
| 9,105,365 B2 | 8/2015 | Singh et al. |
| 9,443,626 B2 | 9/2016 | Bracey et al. |
| 9,466,400 B2 | 10/2016 | Singh et al. |
| 9,793,021 B2 | 10/2017 | Carver et al. |

(Continued)

OTHER PUBLICATIONS

International Search Report for International Application No. PCT/US19/50674 dated Feb. 11, 2020.

*Primary Examiner* — David E Smith
(74) *Attorney, Agent, or Firm* — The Belles Group, P.C.

(57) ABSTRACT

A passively cooled storage module for spent nuclear fuel includes an elongated body including a top end, bottom end, sidewall, baseplate, detachable lid, and cavity for holding a fuel canister containing heat-emitting spent nuclear fuel assemblies. Cooling air inlet ducts spaced draw ambient cooling air radially inwards into a lower portion of the cavity. The air flows upwards in the cavity along the canister and is discharged from the top end of the module to atmosphere via natural circulation. The air inlet ducts may have a multi-angled and recurving configuration comprising one or more obliquely angled sections in one embodiment. The exterior inlet end openings of the inlet ducts are arranged at a higher elevation than the interior outlet end openings to prevent the ingress of standing and flood-related waters. The ducts and lid include radiation shielding features.

19 Claims, 16 Drawing Sheets

(56) References Cited

U.S. PATENT DOCUMENTS

| | | | |
|---|---|---|---|
| 10,049,777 B2 | 8/2018 | Singh | |
| 10,311,987 B2 | 6/2019 | Singh et al. | |
| 2008/0207977 A1 | 8/2008 | Peterson | |
| 2009/0190711 A1 | 7/2009 | Fantini | |
| 2013/0322589 A1 | 12/2013 | Bracey et al. | |
| 2014/0169515 A1 | 6/2014 | Singh et al. | |
| 2014/0247916 A1* | 9/2014 | Singh | G21F 5/06 376/272 |
| 2014/0270042 A1 | 9/2014 | Dederer | |
| 2014/0329455 A1 | 11/2014 | Singh | |
| 2015/0206610 A1 | 7/2015 | Carver et al. | |
| 2015/0243390 A1 | 8/2015 | Bracey et al. | |
| 2016/0005501 A1 | 1/2016 | Singh et al. | |
| 2016/0019991 A1 | 1/2016 | Dederer | |
| 2016/0035444 A1 | 2/2016 | Singh et al. | |
| 2016/0035446 A1* | 2/2016 | Cheng | G21F 5/12 376/272 |
| 2017/0110210 A1* | 4/2017 | Singh | G21F 5/008 |
| 2018/0005717 A1 | 1/2018 | Singh et al. | |
| 2018/0075933 A1 | 3/2018 | Al Rashdan | |
| 2018/0130566 A1* | 5/2018 | Hida | G21F 5/005 |
| 2018/0144841 A1 | 5/2018 | Singh | |
| 2019/0103197 A1 | 4/2019 | Singh et al. | |
| 2019/0131024 A1 | 5/2019 | Pfeifer et al. | |
| 2019/0139661 A1 | 5/2019 | Singh | |

* cited by examiner

FLOOD AND WIND-RESISTANT VENTILATED MODULE FOR SPENT NUCLEAR FUEL STORAGE

CROSS-REFERENCE TO RELATED APPLICATIONS

The present application claims the benefit of U.S. Provisional Application No. 62/729,482 filed Sep. 11, 2018, which is incorporated herein by reference in its entirety.

BACKGROUND

The present invention relates generally to ventilated dry storage modules used to store and/or transport heat-emitting spent nuclear fuel ("SNF") from nuclear power generating plants or other facilities.

In the operation of nuclear reactors, the nuclear energy source is typically in the form of a plurality of hollow Zircaloy tubes each filled with enriched uranium pellets, which are collectively arranged in assemblages referred to as fuel assemblies. When the energy in the fuel assembly has been depleted to a certain predetermined level, the fuel assembly is removed from the nuclear reactor and referred to as used or spent nuclear fuel ("SNF"). The standard structure used to package used or spent fuel assemblies discharged from light water reactors for off-site shipment or on-site dry storage is known as the fuel basket. The fuel basket is essentially an assemblage of prismatic storage cells each of which is sized to store one fuel assembly each of which in turn comprises a plurality of individual spent nuclear fuel rods. The fuel basket is arranged inside a metallic storage canister, which in turn is placed inside a ventilated outer overpack or module for safe transport and/or storage of the multiple spent fuel assemblies within the inner fuel basket.

In addition to emitting dangerous ionizing neutron and gamma photons (i.e. neutron and gamma radiation) requiring protective shielding, the highly radioactive SNF in the fuel assemblies still produces considerable heat which must be dissipated to avoid damage to the fuel assemblies. Cooling of conventional ventilated modules suffers from several drawbacks. The cooling air inlets are typically close to the support pad and susceptible to blockage by snow, debris, or runoff and floor waters at outdoor flood prone sites. In unsheltered locations, the variability in wind direction with respect to the location of cooling air inlet and outlet duct locations may adversely impact the air flow rate and cooling of the fuel assemblies. At sunny sites, the support pad absorbs solar radiation which heats the pad, thereby in turn heating the incoming air as it passes over the pad since the air inlets are close to the pad. This adversely affects cooling performance and efficiency resulting in inadequate cooling of the fuel assemblies held inside the outer storage module.

A need exists for improved nuclear fuel storage modules.

BRIEF SUMMARY

The present application is directed to an improved ventilated dry storage system for passively cooling spent nuclear fuel using available ambient cooling air. An outer ventilated storage cask or module for dry storage of SNF. The module has an elongated body which comprises an internal cavity configured for holding a single SNF canister containing a plurality of heat-emitting nuclear fuel assemblies. The module may be vertically oriented in one embodiment and rests on a concrete support pad. A plurality of radially oriented cooling air inlet ducts spaced circumferentially around the module body fluidly connects the internal cavity with ambient cooling air outside the module. The inlet ducts each draw cooling air radially inwards into the cavity via natural circulation and distributes the air around the canister which emits heat produced by the SNF. The cooling air flows alongside the canister and upwards in the cavity due to the natural chimney effect as it is heated by the heat emitted by the SNF inside the canister and exits the top of the cavity via one or a plurality of air outlet ducts. The outlet ducts may be radially oriented in one embodiment. No blower or fans are used to supply pressurized cooling air to the canister.

In one embodiment, the air inlet ducts may each have a recurving configuration to draw cooling air radially inwards and initially upwards into each air inlet duct, and then redirect the cooling air downwards in the air inlet duct into the lowermost part of the internal cavity of the module. The inlet ducts may have a multi-angled configuration such that no straight line of sight exists between the inlet and outlet end openings of the air inlet ducts to prevent neutron streaming from the canister to ambient atmosphere. In some embodiments, radiation attenuation shielding comprising steel or other radiation attenuation inserts or shields may be incorporated into the ducts to enhance radiation blocking.

The present cooling air inlet ducts may each have an inlet end opening located at a different preferably higher elevation than the outlet end opening which opens into the cavity of the storage module. The inlet end openings may be sufficiently elevated above the concrete support pad and bottom of the module to prevent flood waters from entering the module particularly in flood prone SNF storage sites. In addition, this advantageously elevates the inlet end openings of each duct above the pad or ground surrounding the fuel storage module by a distance sufficient to minimize heating the cooling air entering the ducts by the concrete support pads encountered by the foregoing conventional SNF fuel storage module duct arrangements previously described above. The inlet openings are arranged to draw air radially directly inward into the internal cavity of the module from the ambient environment surrounding the lower portion of the storage module. In one embodiment, the inlet end openings of each cooling air inlet duct preferably may be below the vertical midline of module. This also avoids thermal interference between the air inlet ducts and outlet ducts near the top of the module to avoid heating the cooling air drawn into the module cavity with the already heated air leaving the outlet ducts. In some arrangements, the inlet end openings have a vertically staggered arrangement in which the elevation of the inlet end opening of each air inlet duct is at a different elevation than the inlet end opening of each adjacent inlet air duct to maximize the supply of available cool ambient air to each inlet duct in the event air temperature stratification surrounding the storage module is present when the air is calm.

The present disclosure also provides an improved module lid comprised of a metallic shell filled with concrete for radiation shielding. The lid is configured such that an interface between the top end of the SNF storage module and the lid forms a circumferentially-extending vertical annular gap which defines radial air outlet ducts for ejecting cooling air heated by the canister in the module cavity to atmosphere. In lieu of a multitude of individual discrete air outlet ducts which increases resistance to airflow, the present air outlet ducts are radially open to atmosphere for substantially a full 360 degrees around the circumference of the lid-to-module interface to minimize airflow resistance and maximize ejection of heated cooling air by discharging the air around the entire circumference of the module. This provides essentially radially symmetric outflow of heated air from the module.

The present module lid also comprises a pair of lifting beams in the form of vertical plates embedded in the concrete liner of the lid. The lifting beans may be arranged in an interlocked X-shaped configuration in one embodiment. The beam plates each have an exposed downwardly extending lower portion which may be stepped in configuration and is insertable into the open top of the SNF storage module to create neutron scatter and enhance radiation attenuation. In addition, this unique configuration provides a wind-resistant feature which divides the radial cooling air outlet duct into four discrete sectors or quadrants beneath the lid at the interface to the module body to block. This advantageously mitigates the adverse impacts of wind working directly against the discharge flow of heated cooling air radially outwards form the air outlet ducts of the module. Accordingly, because the wind typically blows from one direction at a time, only heated cooling air discharged from primarily one cooling air outlet quadrant might be adversely affected since the downwardly extending lower portion of the lifting beam plates shields or shrouds the other remaining air outlet quadrants from the wind. It further bears noting that discharging heated cooling air from entire sectors or quadrants at the top end of module beneath the lid creates a larger air outlet flow area and concomitantly less resistance to flow than individual smaller ducts. This advantageously maximizes the outflow of heated air and heat removal from the SNF canister in the module.

In one aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway fluidly connecting ambient atmosphere with the internal cavity; each air inlet duct having an inlet end opening at an exterior surface of the sidewall and an outlet end opening at an interior surface of the sidewall adjoining the cavity; wherein the air inlet ducts each have a recurving configuration to draw cooling air radially inwards and initially upwards from ambient atmosphere, and then redirect the cooling air downwards through the air inlet duct into a lower part of the internal cavity of the module.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells; a plurality of radially oriented interconnector plates embedded in the fill material and welded to the inner and outer shells to rigidly couple shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the sidewall of the module configured to fluidly connect ambient atmosphere with the internal cavity; the air inlet ducts each having an inlet end opening at exterior surface of the sidewall which is at a higher elevation than at an outlet end opening of each air inlet duct at an interior surface of sidewall adjacent to the internal cavity; wherein cooling air is drawn into the internal cavity through each air inlet duct, flows upwards alongside the canister thereby heating the cooling air, and the heated cooling air is discharged back to atmosphere through a plurality of air outlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards through and beneath a bottom cover of the lid into a top end of the cavity.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having an inlet end opening at an exterior surface of the sidewall which is at a higher elevation than at an outlet end opening of each air inlet duct at an interior surface of sidewall adjoining the internal cavity; the air inlet ducts each comprising an upper roof wall and a lower floor wall; wherein a highest point of the roof wall of each air inlet duct is at an elevation higher than a top of the inlet end opening of the air inlet duct.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having an exterior inlet end opening and an interior outlet end opening adjoining the cavity; wherein the inlet end openings are vertically staggered in arrangement in which the elevation of the inlet end opening of each air inlet duct is at a different elevation than the inlet end opening of each adjacent inlet air duct.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts spaced circumferentially apart around the body, the inlet ducts each forming a radially oriented air inlet passageway through the sidewall fluidly connecting ambient atmosphere with the internal cavity; the air inlet ducts each having a radiation attenuation shield member attached to an exterior surface thereof.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells, and a plurality of radially oriented interconnector plates embedded in the fill material and rigidly coupling the inner and outer shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the sidewall of the module configured to fluidly connect ambient atmosphere with the internal cavity; the air inlet ducts each having an inlet end opening at an exterior surface of the sidewall which is at a higher elevation than at an outlet end opening of each air inlet duct at an interior surface of sidewall adjacent to the internal cavity; wherein cooling air is drawn into the internal cavity through each air inlet duct, flows upwards alongside the canister thereby heating the cooling air, and the heated cooling air is discharged back to atmosphere through the air outlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards beneath a bottom cover of the lid into a top end of the cavity.

In another aspect, a ventilated dry storage system for passive cooling of spent nuclear fuel comprises: an elongated module defining a top end, a bottom end, and a sidewall extending between the ends defining an internal cavity extending along a longitudinal axis; the sidewall including an inner shell, an outer shell, a radiation shielding fill material disposed between the shells; a plurality of radially oriented interconnector plates embedded in the fill material and welded to the inner and outer shells to rigidly couple shells together; a base plate sealingly affixed to the bottom end of the module; a removable lid detachably coupled to the top end of the module; a fuel storage canister disposed in the internal cavity and containing heat-emitting spent nuclear fuel; a plurality of cooling air inlet ducts each forming a radially oriented air inlet passageway through the fill material of the module and configured to fluidly connect ambient atmosphere with the internal cavity; wherein each of the interconnector plates are disposed between adjacent ones of the air inlet ducts.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a baseplate attached to the bottom end of the module body; a plurality of cooling air inlet ducts fluidly connecting ambient atmosphere with the internal cavity; a lid detachably coupled to a top end of the module body to access the internal cavity; the lid comprising a metallic shell filled with concrete and a first lifting beam embedded in the concrete; wherein the first lifting beam includes a lower portion which protrudes downwards through and beneath a bottom cover of the lid into a top end of the cavity.

In another aspect, a passively cooled storage module for spent nuclear fuel comprises: an elongated module body defining a top end, a bottom end, a sidewall, and an internal cavity extending between the ends along a longitudinal axis, the internal cavity being configured for holding a fuel storage canister; a plurality of cooling air inlet ducts fluidly connecting ambient atmosphere with the internal cavity; a lid detachably coupled to a top end of the module body to access the internal cavity; the lid comprising a pair of lifting beams each including a downwardly extending lower portion which protrudes below the top end of the module into the cavity; wherein the lower portions of the lifting beams divides the interface into quadrant-shaped cooling air outlet ducts for radially discharging the cooling air from the cavity to atmosphere.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
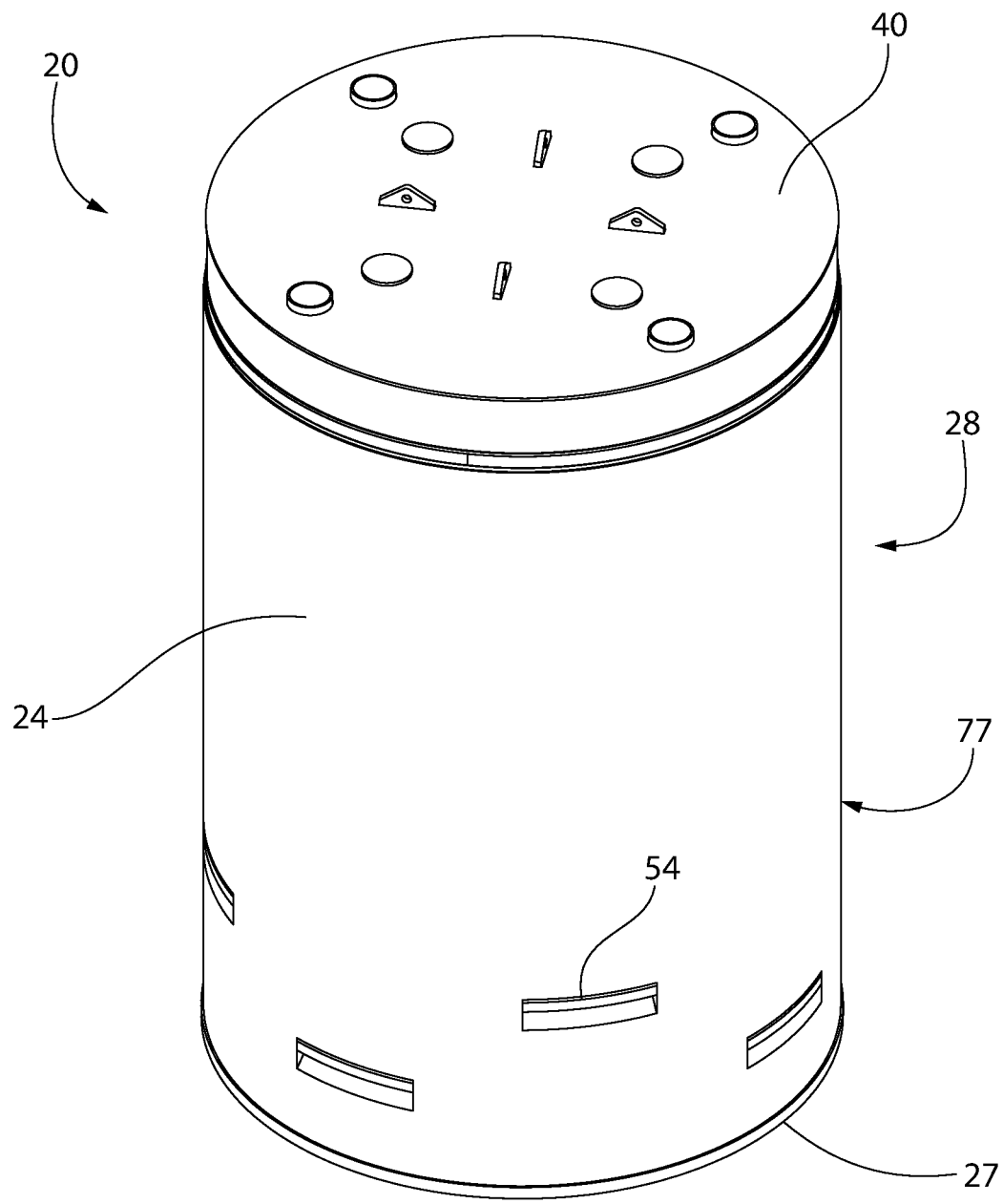
FIG. 1 is a perspective view of a storage system in the form of a radiation-shielded ventilated module for storing spent nuclear fuel including cooling air inlet and outlet ducts for passive cooling of the fuel.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIGS. 1-5 depict a nuclear fuel storage system comprising a passively cooled and ventilated outer storage module 20 configured to hold a single fuel canister loaded with spent nuclear fuel (SNF) assemblies emitting radioactive decay heat. Module 20 may be a double-walled vessel in one embodiment having an elongated module body 28 including cylindrical outer shell 24, inner shell 23, and radiation shielding which may comprise a concrete mass or liner 72 in one exemplary construction which is disposed in an annular space therebetween for radiation blocking. Other shielding materials may be used in addition to or instead of concrete including lead for radiation shielding, including for example boron containing materials (e.g. Metamic® or others), steel, lead, and others typically used for such purposed in the art. Inner shell 23 defines an interior surface 76 and outer shell 24 defines an exterior surface 77 of the module. Surfaces 76, 77 may be cylindrical and arcuately curved in one embodiment. The passively cooled storage module 20 may be vertically elongated and oriented as shown in the illustrated embodiment; however, other orientations such as horizontal may be used with the same features described herein. The inner and outer shells 23, 24 may be formed of a suitable metallic material, such as without limitation steel (e.g. carbon or stainless) which may be epoxy painted/coated in one embodiment for corrosion protection. Shells 23, 24 may each have representative thickness of about ¾ inches as one non-limiting example.

A vertically-extending central cavity 26 extends along a centerline or longitudinal axis LA defined by the vertically elongated module body 28. Cavity 26 may be of cylindrical configuration in one embodiment; however, other shaped cavities may be used including polygonal shapes and other non-polygonal shapes (e.g. rectilinear, hexagon, octagonal, etc.). A metal baseplate 27 seal welded to the bottom end 24 of the module 20 closes the bottom of the cavity. Baseplate 27 is configured for placement on a preferably flat concrete support pad which provides radiation shielding in the vertical downwards direction. Baseplate 27 may be made of a similar material to the shells 23, 24. In one embodiment, baseplate may be about 3 inches thick.

Figure 3:
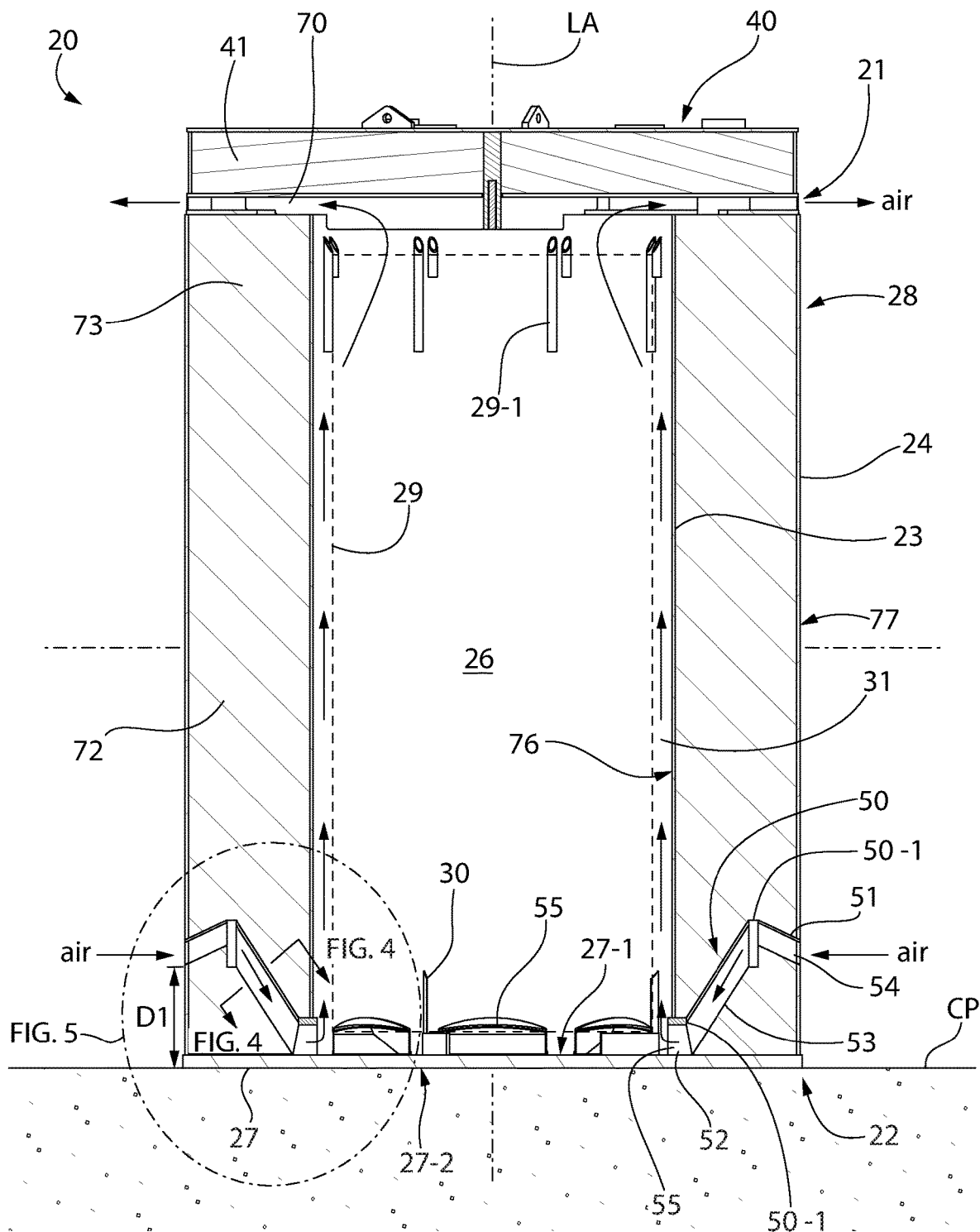
FIG. 3 is side cross-sectional view thereof.

Cavity 26 of module 20 has a configuration and height suitable for holding a single SNF canister 29 therein (represented by dashed lines in FIG. 3). The diameter of cavity 26 is intentionally larger than the diameter of the fuel canister 29 by a smaller amount to form a ventilation annulus 31 between the canister and inner shell 23 of the module. The width of annulus 31 preferably is sufficient to draw heat generated by the SNF within the canister away from the canister as the cooling air flows upwards alongside the canister. A typical airflow annulus may be in the range of about and including 2-6 inches in width as a non-limiting example depending the estimated heat load of the fuel canister 29. The annulus 31 extends vertically for the full height of the canister which may terminate at top adjacent to the top ends of guide tubes 29-1 (see, e.g. FIG. 3). Accordingly the canister 29 has a height approaching the height of the cavity 26, and at least greater than ¾th the height of the cavity as shown.

A plurality of radially and vertically extending support brackets 30 are disposed at the bottom of cavity 26 which are configured to engage and center the canister 29 to maintain the ventilation annulus 31. Brackets 30 are interspersed between some the air inlet ducts 50 and configured to elevate the bottom of the canister above the top surface 27-1 of baseplate 27. This allows ambient cooling air to circulate beneath the canister.

Support brackets 30 may be L-shaped in one embodiment as shown and preferably are made of steel (e.g. carbon or stainless). Brackets 30 may have a typical thickness of about ¾ inches in one embodiment and are integrally attached to the baseplate 27 and preferably also inner shell 23 as well such as via welding. Brackets 30 each have a horizontal portion 31 which extends radially inwards from the inner shell 23 towards centerline longitudinal axis LA of module 20 and a vertical portion 32 which extends vertically upwards from the baseplate along the interior surface 76 of inner shell 23 and parallel to the longitudinal axis. Horizontal portions 31 may be about 5 inches high in one non-limiting embodiment. The vertical portions 32 of brackets 30 may have a height suitable to effective center the canister 29 when inserted in cavity 26 and maintain the ventilation annulus 31 between the canister and inner shell 23 (e.g. about 2 feet or less in some embodiments). The top ends of the vertical portions 32 of brackets 30 may be angled or chamfered to create a lead-in which facilitates guiding and centering the canister 29 when through the open top end 21 of the module in cavity 26 via a crane or hoist. The baseplate equipped with the steel support brackets 30 advantageously serves to stiffen the baseplate 27 and support the fuel-bearing canister 29 in a manner that minimizes the bending stress in the baseplate since a portion of the dead weight of the canister is carried by the inner shell 23. The vertical portions of each bracket 30 further restrains the canister from moving laterally when the storage module 28 is being lifted and carried by a crane and/or cask handling crawler, or during a seismic even which rattles the module 20.

The top of the canister 29 may be centered in module cavity 26 by plural circumferentially spaced apart guide tubes 29-1 rigidly attached to the interior surface 76 of the inner shell 23 proximate to its top end such as via welding.

Guide tubes 29-1 are provided around the entire inner shell for full 360 degree coverage. The inward sides guide tubes are configured to abuttingly engage and prevent the canister from excessively moving laterally or rattling if vibrated during a seismic event or when lifted by a crane or hoist.

Module 20 further includes a top end 21, bottom end 22, and longitudinally-extending sidewall 77 extending between the ends. A baseplate 27 is seal welded to bottom end 22 of the module to prevent the ingress of water into the cavity 26. Baseplate 27 may be circular and flat in configuration in one embodiment and defines an upward facing flat top surface 27-1 exposed to cavity 26. The flat bottom surface 27-2 of the baseplate is intended for placement on a concrete support pad CP. Baseplate 27 may be formed a suitable metal compatible for welding to the bottom ends of the inner and outer shells 23, 24, such as steel (e.g. carbon or stainless).

Referring to FIGS. 3 and 7-11, a removable lid 40 is detachably coupled to the module top end 21 which closes the normally upwardly open cavity 26 when in place. Lid 40 may be a hollow circular structural shell filled with a radiation shielding material such as a concrete plug or liner 41. Other shielding materials may be used in addition to or instead of concrete. Lid 40 provides radiation shielding in the vertical direction, whereas the concrete liner 72 disposed in the sidewall 77 of the module provides radiation shielding in the lateral or horizontal direction.

In one embodiment, lid 40 may have a generally circular structure including an outer shell comprising a top cover 43, bottom cover 45, and a circumferentially-extending peripheral ring wall 48. Concrete liner 41 is encased inside the top and bottom covers and the ring wall which are welded together to form a permanently joined assembly, such as via seal welding in one embodiment. The opposing top and bottom major surfaces of each of the covers 43, 45 may be parallel to each other and flat as shown.

A pair of lifting ribs or beams 49 are at least partially embedded in the concrete liner 41 of the shell. The lifting beams 49 may each have an interlocked X-shaped arrangement oriented perpendicularly to each other. Each beam may be a strong flat vertically oriented metallic plate (e.g. steel) arranged perpendicularly to each other as shown. The beams 49 are interlocked to each other via mating vertical slots 49-2 as shown and welded together. One slot opens upwardly and the other downwardly such that the bottom edges of the beams 49 lie in the same horizontal reference plane when the beam assembly is completed.

Figure 12:
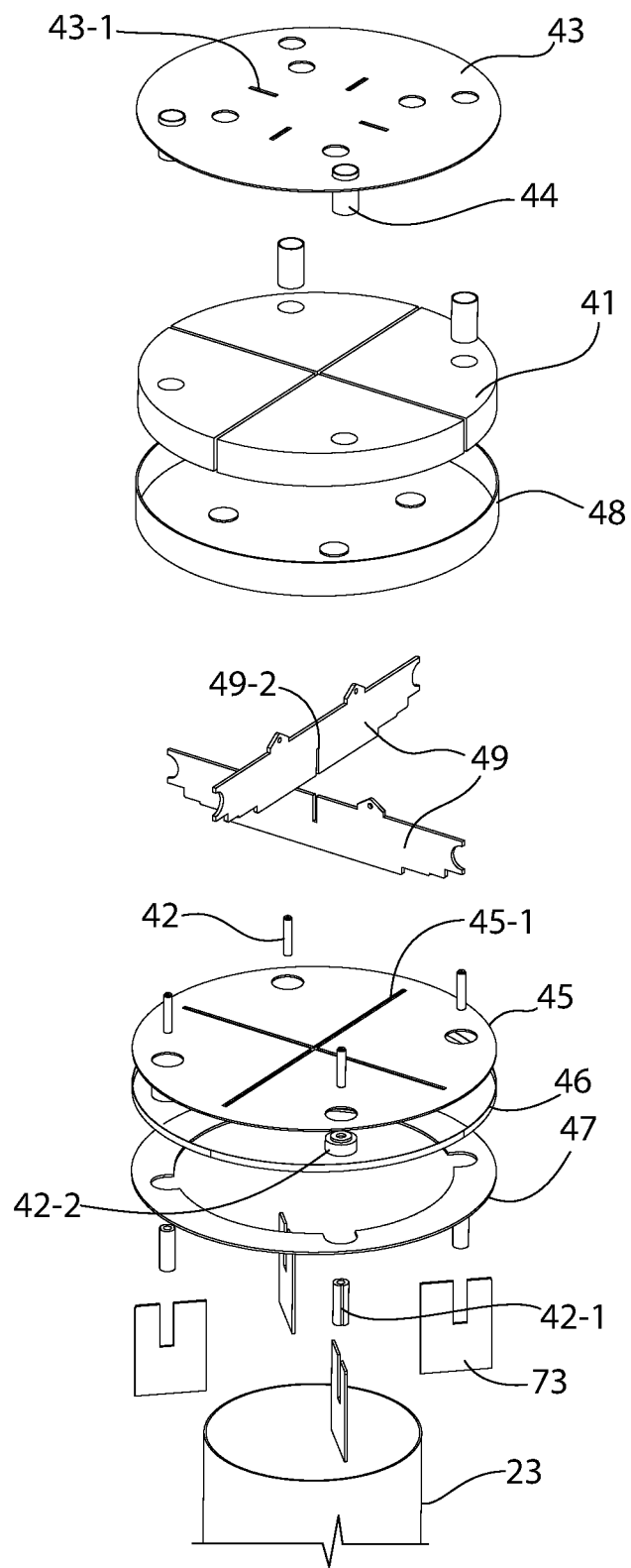
FIG. 12 is an exploded perspective view of the top closure lid assembly of the modules of FIGS. 1 and 7.
Figure 13:
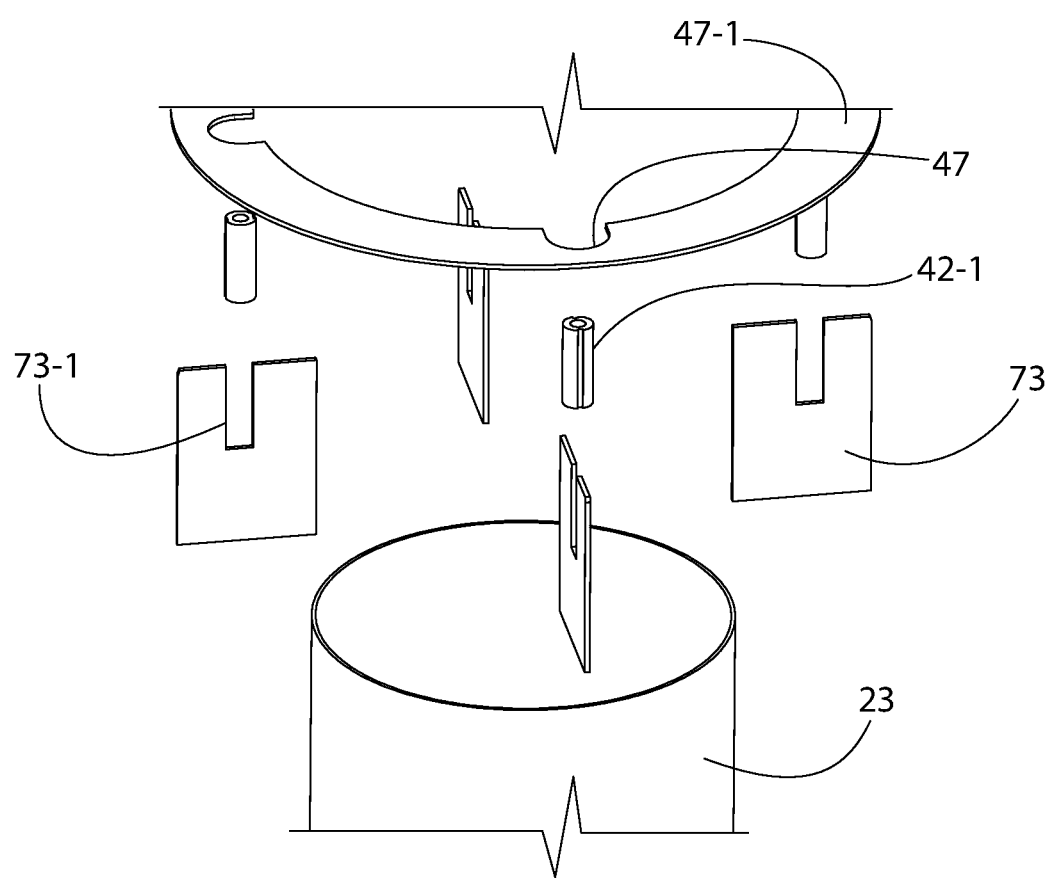
FIG. 13 is an enlarged detail taken from FIG. 12.
Figure 14:
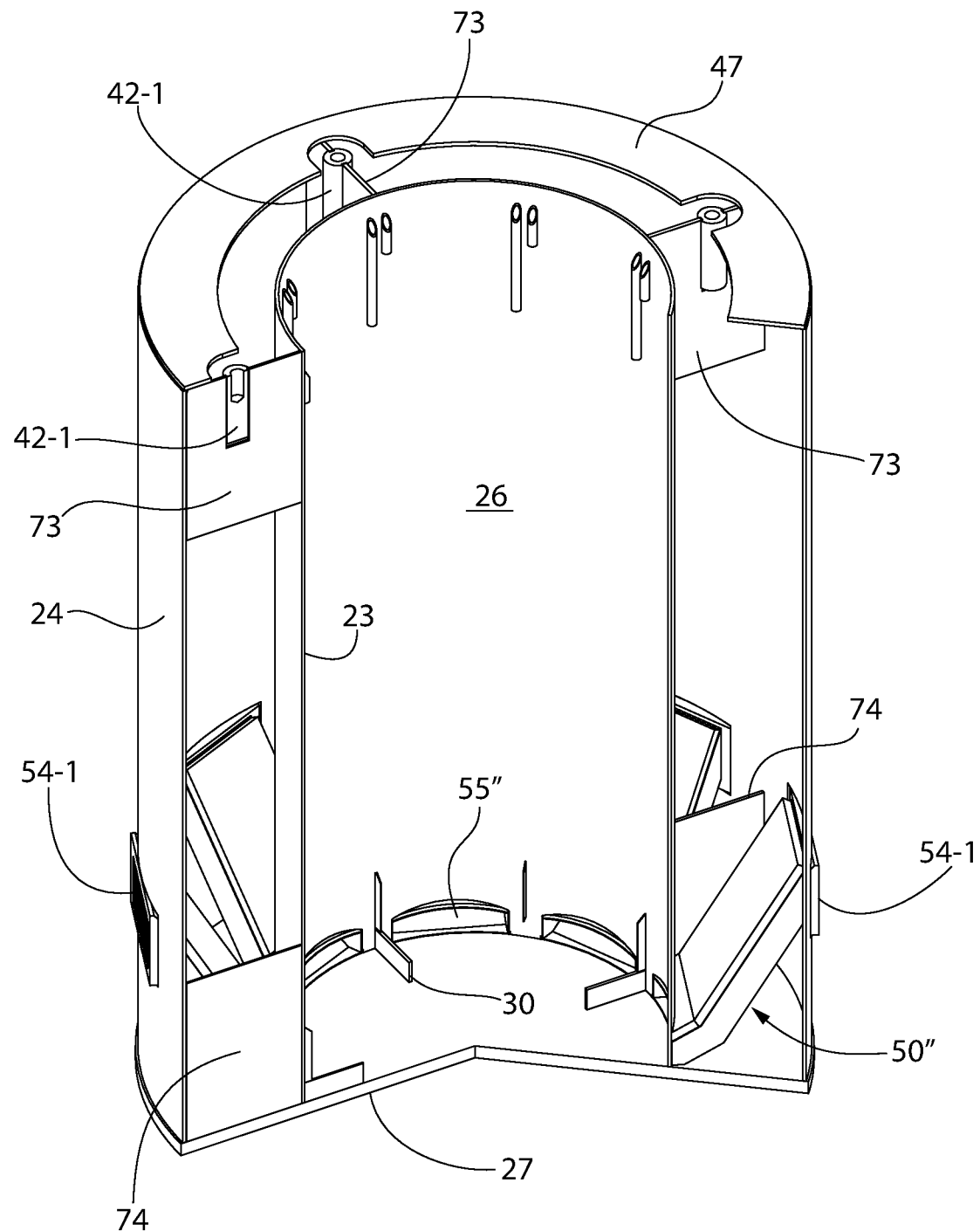
FIG. 14 is a perspective cross sectional view of the module of FIG. 7.

The lifting beam 49 plates extend laterally/horizontal for the full diameter of the lid and may abut the inner surface of the peripheral ring wall 48. The lifting beam plates extend vertically from the bottom surface of the top cover 43 downwards through the bottom cover 45 via an X-shaped slot 45-1 formed in the bottom cover. The slot is complementary configured to the lifting beam plates (best shown in FIG. 12). The lower portions 49-3 of the lifting beams 49 thus are exposed and protrude vertically below the bottom major surface of the lid's bottom cover 45. In one embodiment, the exposed lower portions of beams 49 may have a multi-stepped configuration and project downward farther than the annular outlet vent screen 46. One purpose is to protect the screen from damage when the lid is placed on a flat surface during the canister loading operations.

Figure 15:
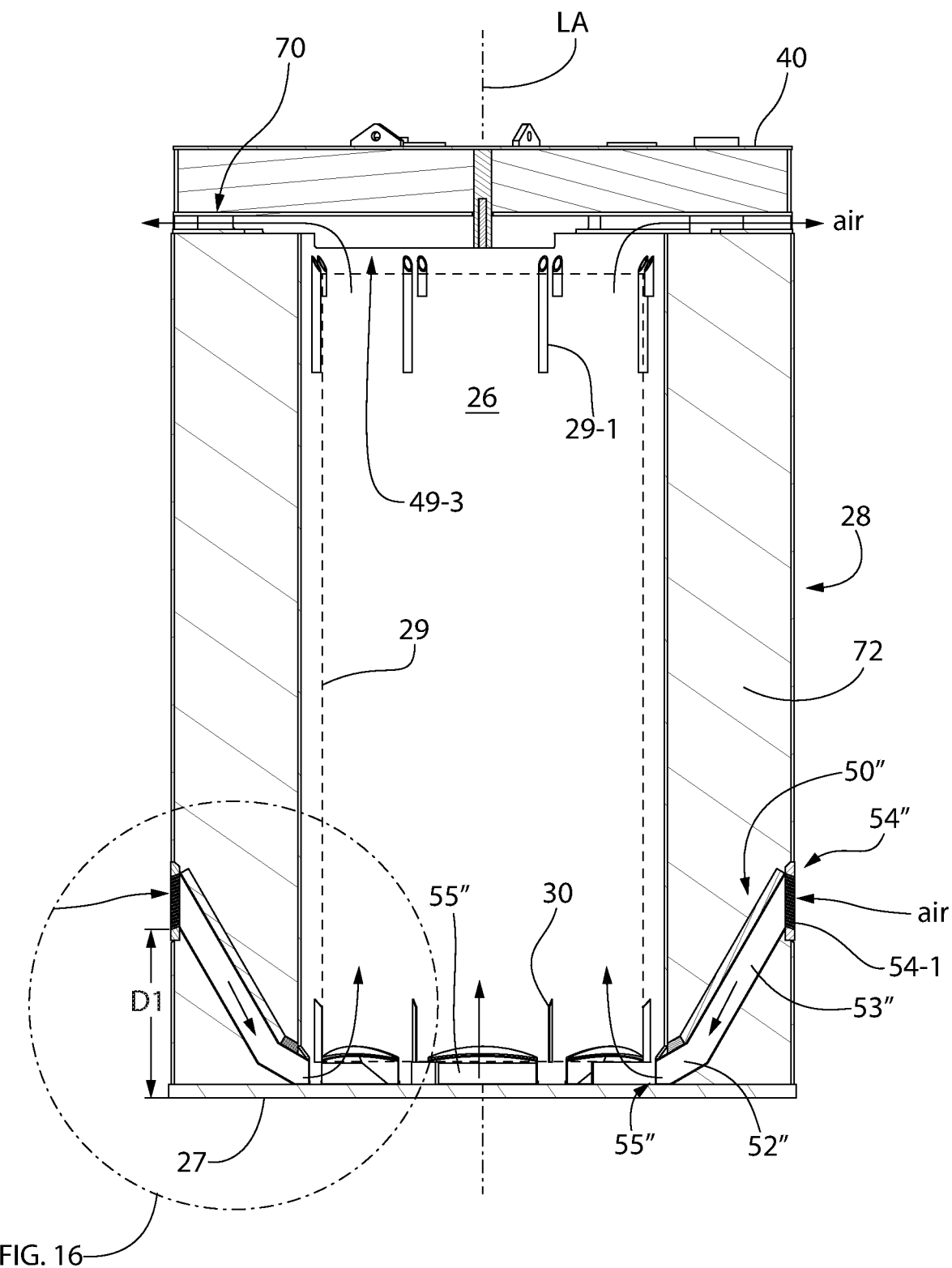
FIG. 15 is a side cross sectional view thereof showing the cooling air inlet and outlet ducts.
Figure 16:
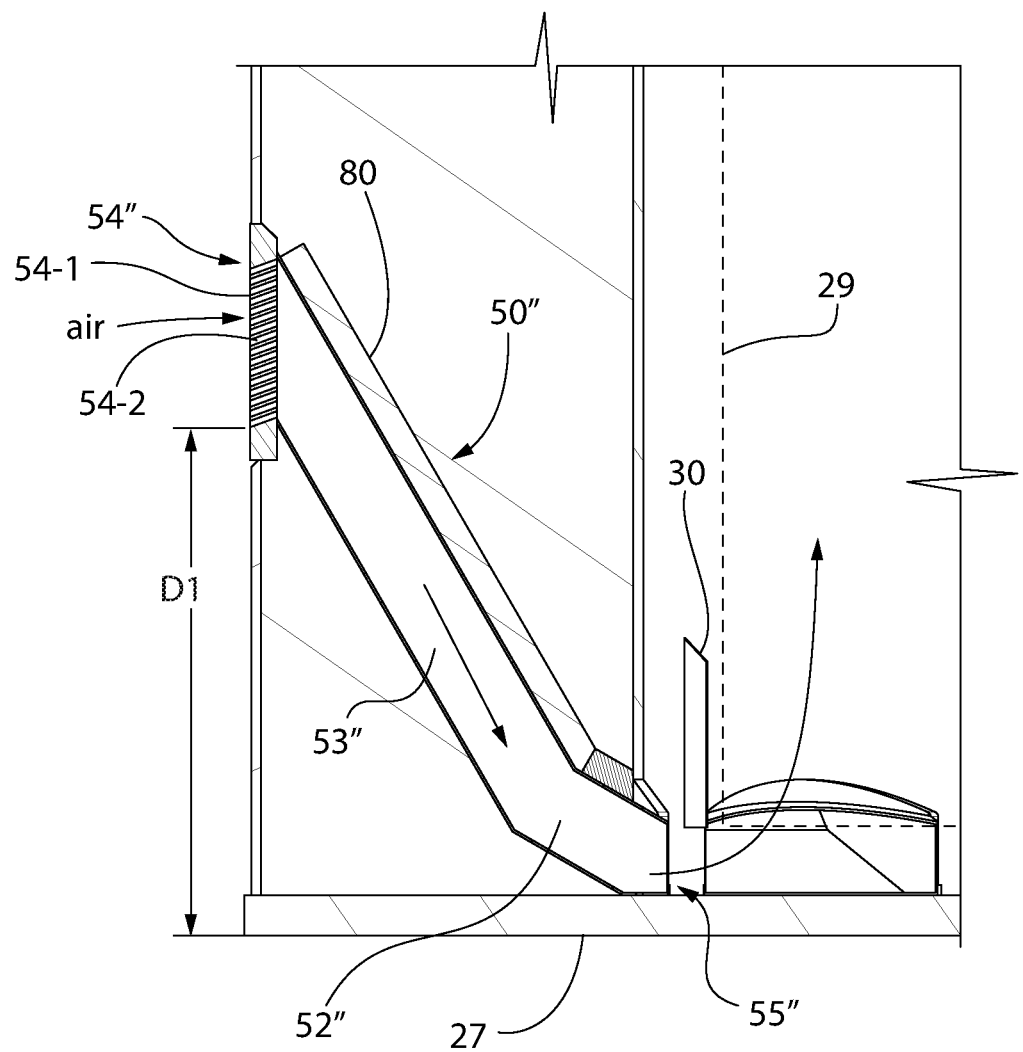
FIG. 16 is an enlarged detail taken form FIG. 15.
Figure 17:
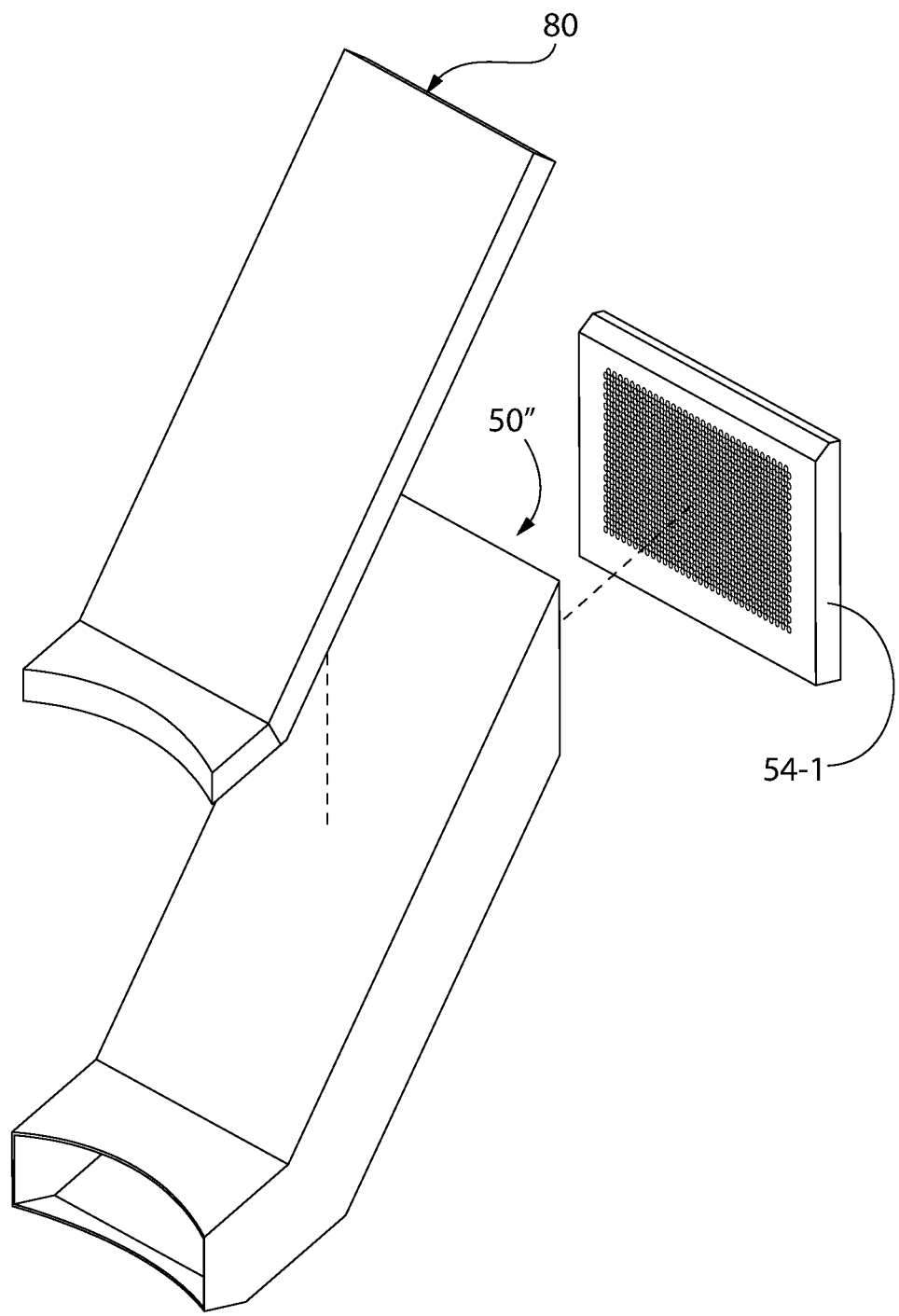
FIG. 17 is an exploded view of one cooling air inlet duct assembly components thereof.

According to a notable aspect of the lid 40, the centralmost and vertically deepest/highest part of the exposed beam lower portions 49-3 may further project downwards into the cavity below the top end 21 of the module body 28 when the lid 40 is seated on top of the module. This feature, along with the vertically shallower/shorter outer peripheral portions of the exposed stepped lower portions 49-3 of lifting beams 49, advantageously provide enhanced radiation attenuation and shielding to minimize block radiation escape through the cooling air outlet vents 70 (see, e.g. FIG. 15). This downward projection of the lifting beam lower portion 49-3 causes neutron scatter and interferes with the radial streaming and scattering of radiation out of the air outlet vents 70. Beneficially, use of the metallic lifting beams plates to block neutron stream instead of a solid concrete plug used in some lid designs make the present lid 40 lighter in weight, easier to handle, and eliminates the need for complexly configured air venting arrangements formed through lid which adds to fabrication costs. Additionally, the stepped lower portions 49-3 of lifting beams 49 also as act as shear support under side impact forces or lateral vibrations induced by seismic events. This keeps the lid 40 centered on the module 20 and reduces shearing forces on the closure fasteners 42.

Another unique aspect of the downwardly protruding exposed lower portion 49-3 of the lifting beam 49 plates is that it divides the circumferentially-extending radial cooling air outlet 70 into four quadrants beneath the lid at the lid-to-module body interface. The quadrant-shaped air outlet ducts 70 act as wind breaks or shields to block and mitigate the adverse impacts of wind blowing against on the radial discharge direction of heated cooling air emitted from the module. Accordingly, because the wind typically blows from one direction, only heated cooling air flow discharged from the windward single or pair of air outlet quadrant might be impeded due to the increased backpressure caused by the wind since the lower portion of the lifting beam plates generally shields the other remaining leeward quadrants from the wind to maintain their normal discharge airflow rate. It further bears noting that the quadrant-shaped air outlet ducts 70 further provide a greater air discharge flow area with full 360 degree outflow from the module 20 than multiple individual smaller ducts which create a greater resistance to air flow that impedes heat removal from the SNF canister in the module cavity 26. The cavity is thus fully open to the underside of the lid without requiring the heated cooling air to be funneled into smaller diameter or sized outlet ducts with concomitant reduction in discharge of heat air from the module.

When the lid 40 is emplaced on the storage module 20, it bears noting that the shallower outer peripheral portions of the exposed stepped lower portions 49-3 of lifting beams 49 are configured to engage the top end 21 of the module body 28 which supports the weight of the lid. This engagement also eliminates annular gaps between the stepped lower portion 49-3 and module to enhance radiation shielding and wind blocking. Accordingly, it is apparent to one skilled in the art that the unique lifting beams 49 configuration disclosed herein provides a multitude of benefits beyond simply providing a lifting structure for the lid.

Each lifting beam 49 further includes a pair of upwardly protruding lifting lug 49-1 which extend upwards through slots 43-1 in the top cover 43. Each lifting lug includes a hole for coupling rigging thereto to raise and lower the lid with a crane or hoist. The lifting beams 49 and lid have a sufficiently robust structure and thicknesses to allow the entire storage module 20 with loaded SNF canister 29 therein to be lifted via the lifting beams. The X-shaped lifting beam arrangement ensures that the weight of the lid 40 is carried evenly to prevent distortion when lifted.

Figure 2:
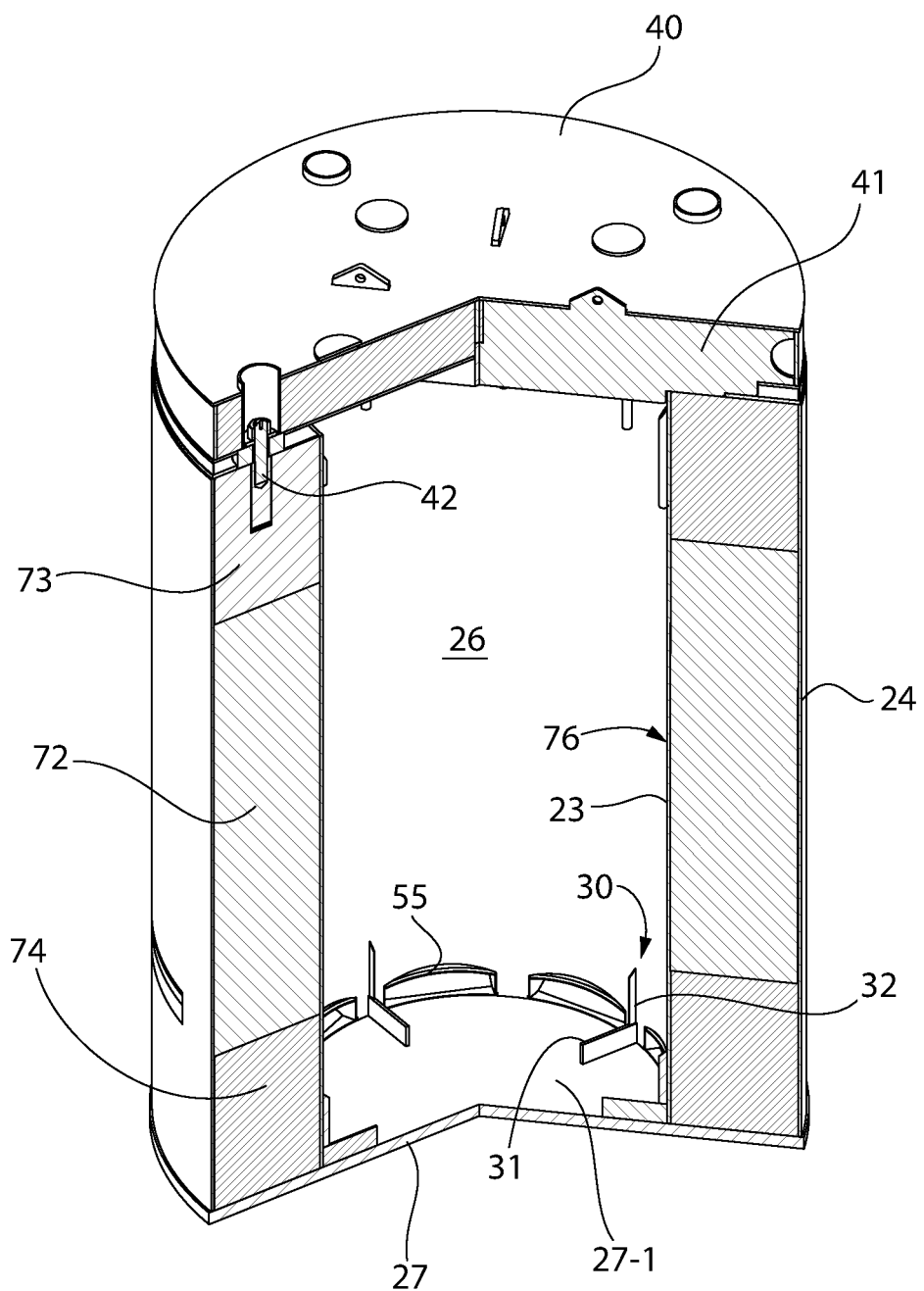
FIG. 2 is a cross-sectional perspective view thereof.

To secure the lid to the module body 28 in a manner which allows the module to be lifted via the lid 40 and lifting beams 49, the lid 40 may be bolted to the top end 21 of the module body via a plurality of threaded closure fasteners 42 (see, e.g. FIG. 2). Four fasteners may be used in one representative construction. The fasteners 42 may be one piece or comprise an assemblage of a threaded stud and heavy hex nut. The module body 28 includes internally threaded mounting sleeves 42-1 rigidly mounted in its top end 21 which threadably engage the fasteners 42. In one embodiment, the mounting sleeves 42-1 may be welded to metallic upper radial shell interconnector plates 73 rigidly affixed to the inner and outer shells 23, 24 of the module 20 (further described below). The interconnector plates 73 form part of the module's superstructure. Upwardly open mounting slots 73-1 may be formed in plates 73 which receive the sleeves for welding thereto.

To maintain a vertical opening through lid 40 for the bolting, a plurality of tubular collars 44 may be rigidly mounted via welding to the top and/or bottom covers 43, 45 of the lid to form passages through the concrete liner for the closure fasteners 42. The collars 44 may protrude slightly above the top surface of the lid's top cover 43. In the unlikely event that the nuclear fuel storage module 20 might tip over on the concrete support pad CP when being maneuvered via the crane, the collars would take the brunt of the force from the fall and transfer it to the robust body of the module to prevent or minimize structural damage to the lid. In various embodiments, the lid 40 may also be seal welded to the module 20 in addition to bolting or instead of bolting; however, the module may be lifted with reliance on the bolting assembly alone for support and strength.

The top end 21 of storage module 20 may further include a top plate ring 47 which partially closes the top end of the module body 28 and sidewall 77. Top plate ring 47 has a circular horizontally flattened body with flat top and bottom surfaces and a height substantially less than a width. Plate ring 47 may be secured to the outer shell 24 via welding, and optionally the tops of the upper interconnector plates 73 thereby forming an integral part of the module body structure.

A plurality of annular lid spacers 42-2 are provided; one spacer 42-2 for each closure fastener 42. The fasteners extend completely through the spacers which are interspersed between the bottom cover 45 of the lid 40 and the top end 21 of the module. Each spacer 42-2 nests partially inside a semi-circular cutout 47-1 in the top plate ring 47 of the module 20 which helps locate the spacers on the module. The spacers 42-2 form and maintain a vertical air gap G at the interface between the bottom cover 45 of the lid 40 and the top end 21 of the module 20 to form the radial cooling air outlet ducts 70. Gap G may be about 3 inches as one representative non-limiting example.

The gap G is closed at its periphery by a perimetrically and circumferentially extending annular outlet vent screen 46. The screen 46 may be comprise a metallic plate ring (e.g. steel) which includes a plurality of radial through perforations or holes forming open area for venting heated cooling air radially outwards between the bottom of lid 40 and top end 21 of the module body 28 from gap G. This defines the cooling air outlet ducts 70. The annular outlet screen 46 may be welded to the bottom cover 45 of lid 40 and protrudes downwardly therefrom for a distance co-extensive in height to and enclosing otherwise radially open gap G.

With exception of the concrete liner, the foregoing lid-related components are preferably all formed of a metal such as without limitation steel (e.g. carbon or stainless).

The vertical nuclear fuel storage module 20 includes a natural circulation cooling air ventilation system. Referring generally to FIGS. 1-14 as applicable, the ventilation provisions include a plurality of cooling air inlet ducts 50 to introduce ambient cooling air into the module cavity 26, and cooling air outlet ducts 70 to expel the air heated from the cavity (which flows vertically upwards alongside the sidewall of the heat-emitting fuel canister 29) back to atmosphere. Both the air inlet and outlet ducts may generally be radially oriented as shown in the illustrated embodiment. In a one non-limiting preferred embodiment, the air inlet ducts 50 are disposed in the lower portion of module 20 proximate to the bottom end 22 of the module and cavity 26, and the air outlet ducts 70 are disposed proximate to the top end 21 of the module and cavity.

Each air inlet duct 50 extends completely through the sidewall 77 of module 20 from the outer shell 24 to the inner shell 23. The ducts 50 define an air inlet passageway which places the lower portion of the module cavity 26 in fluid communication with ambient atmosphere and cooling air. In one embodiment, the air inlet ducts 50 may have a multi-angled circuitous configuration designed to both advantageously prevent the ingress of rain or standing water into the cavity and to prevent straight line neutron streaming to the ambient environment. Each duct 50 includes an exterior inlet end opening 54 forming an opening penetrating the outer shell 24 and an interior outlet end opening 55 forming an opening penetrating the inner shell 23 into the module cavity 26. The outlet end openings of each air inlet duct 50 are arranged to introduce ambient cooling air directly into the bottom of the ventilation annulus 31 between the canister 29 and inner shell 23, and preferably adjacent to the top surface of the baseplate 27. The inlet end opening includes a top 102 and opposing bottom 103. The outlet end opening includes a top 104 and opposing bottom 105. No portion of the air inlet ducts 50 extend below the baseplate, but instead extend only through the sidewalls in the described embodiments.

Figure 4:
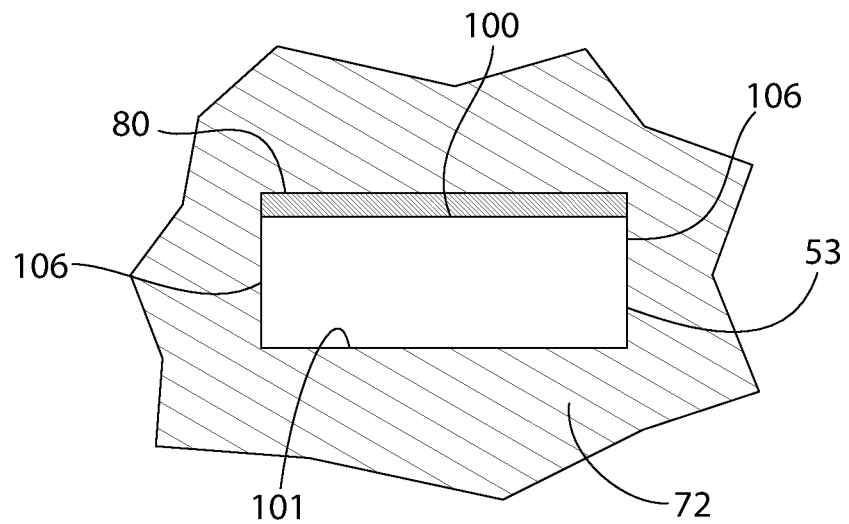
FIG. 4 is cross section through a cooling air inlet duct taken from FIG. 3.
Figure 5:
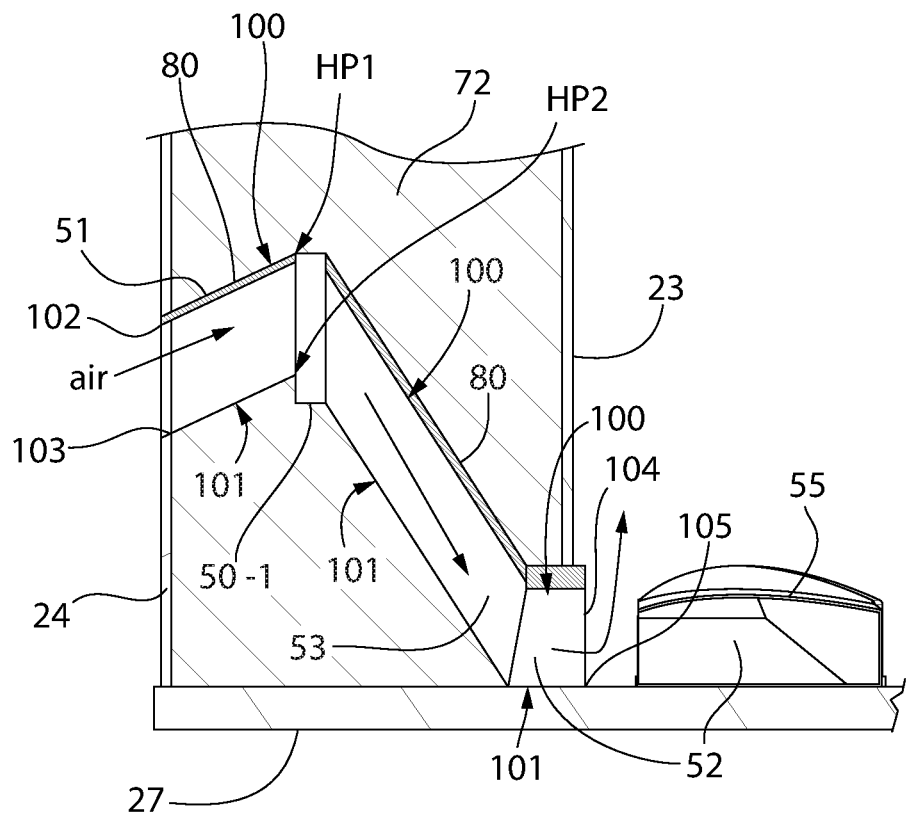
FIG. 5 is an enlarged detail taken from FIG. 3.

Referring to FIGS. 3-5, the air inlet ducts 50 in one non-limiting embodiment includes an inlet section 51 adjacent to the inlet end opening 54, an outlet section 52 adjacent the outlet end opening 55, and an intermediate section 53 extending radially between the inlet and outlet sections. In one embodiment, the air inlet ducts 50 may have a rectilinear transverse cross-sectional configuration such as rectangular (best shown in FIG. 4). Ducts 50 may be horizontally elongated having a greater width than height to produce a slim profile. Each duct 50 includes a roof wall 100, opposing floor wall 101, and pair of lateral sidewalls 106 extending therebetween. Each wall or sidewall is perpendicularly oriented to its adjoining walls or sidewalls. Ducts 50 may be embedded in the concrete liner 72 of the sidewall 77 of the module body. In fabrication, the inlet end opening 55 of each duct 50 is seal welded to the outer shell 24 and the outlet end opening 54 is seal welded to the inner shell 23 of the module. This not only seals the ducts to shell interfaces, but also supports the ducts 50 in position until the concrete liner is poured around the ducts to complete the embedment.

The inlet section 51 of duct 50 penetrates the module outer shell 24 to form the flow inlet end opening 54. Inlet section 51 may be obliquely angled upwards relative to the longitudinal axis LA of the module and baseplate 27 such that the innermost end of inlet section 51 at the joint to intermediate section 53 of duct 50 is higher than its outermost end. This defines the highest point HP1 of the roof wall 100 of the air inlet duct 50, which preferably is higher in elevation than the top 102 of the inlet end opening 54. Such an arrangement advantageously resists the ingress of rainwater into the duct 50 from the ambient environment. To prevent choking off the cooling air flow through the duct 50 to the canister in cavity 26 of the module 20 as the surround water level rises during a flood event, the highest point HP2 of the floor wall 101 of duct 50 preferably is lower in elevation than the top 102 of the air inlet end opening 54. This maintains a flowpath for the cooling air to flow through the air inlet duct 50 to the canister in the module to continue air cooling until the water level rises above the top end 102 of the inlet air opening 54. In that case, water will enter the duct 50 and module cavity 26 to water cool the canister and prevent overheating and degradation of the SNF stored inside and its fuel shielding.

Intermediate section 53 of the cooling air inlet duct 50 may be obliquely angled downwards relative to the longitudinal axis LA such that the innermost end of intermediate section 53 is lower than its outermost end adjoining the inlet section of the duct 50 at the joint. The intermediate section may be longer in length than the inlet and/or outlet sections 51, 52. The upwardly angled inlet section 51 advantageously prevents ingress of rainwater into the inlet duct 50. Outlet section 52 may be horizontal and perpendicularly oriented relative to longitudinal axis LA in one embodiment as illustrated. The outlet section 52 penetrates the module inner shell 23 to form a flow outlet opening. Obliquely angled joints 50-1 may be formed between the duct sections 51, 52, and 53 as shown. In some possible constructions, the outlet section may be omitted and the intermediate section 53 may be directly seal welded to and penetrates the inner shell 23 of module 20 to form the outlet opening.

To prevent standing water or particularly floodwater from entering the cooling air inlet ducts 50 at flood prone nuclear fuel storage sites, the inlet end openings 54 of the ducts in the outer shell 24 are preferably spaced by a sufficient preselected vertical distance D1 above the bottom of the baseplate 27 which rests on the concrete support pad CP. Distance D1 is measured to the bottom 103 of inlet end openings 51 of air inlet ducts 50 from the bottom of the baseplate 27 (see, e.g. FIG. 3). Some representative non-limiting examples of a minimum value of D1 is at least 1 foot, and preferably at least 3 feet in some flood resistant embodiments. Distance D1 may be selected and adjusted as needed based on the prevailing or historic flood levels anticipated at the nuclear fuel storage site.

In one embodiment, the inlet end openings 54 of the cooling air inlet ducts 50 are located at a higher elevation than the outlet end openings 55. The inlet end openings are located on a lower half or portion of the module below the module vertical midline ML defined at half a height of the module (measured from top end 21 to bottom of the baseplate 27 integrally attached to the bottom end 22 of the shells 23, 24). In one embodiment, the inlet end openings 54 are located on the lower portion of the module at 25 percent or less than the height of the module below the midline ML. The air inlet ducts 50 are configured to draw cooling air radially inwards into each duct through the inlet end openings 54 and direct the cooling air then downwards in the air inlet duct to its respective outlet end opening 55 and into cavity 26. Cooling air is therefore radially discharged into the internal cavity of the module from the outlet end openings of each air inlet duct 50. It bears noting that the inlet end openings 54 of the air inlet ducts are radially open directly to ambient atmosphere without any additional extension piping or ducting which adversely increases resistance to flow and decreases the cooling air flow into the module cavity 26.

In one embodiment, the inlet end openings 54 of the air inlet ducts 50 may have a vertically staggered arrangement in which the elevation of the inlet end of each inlet air duct is at a different elevation and distance D1 above concrete support pad CP than the inlets end of each adjacent inlet air duct on either side as shown. This staggered arrangement advantageously prevents each inlet duct 50 from drawing ambient cooling air from the same elevation to maximize cooling effectiveness and eliminate potential temperature stratification of available cooling air surrounding the storage module 20. It bears noting that the lowest inlet end openings 54 of the air inlet ducts 50 in the staggered arrangement if used may meet the foregoing elevation criteria previously described herein for placement in accordance with vertical spacing distance D1 above the baseplate 27 and concrete support pad CP to prevent the ingress of standing water or floodwater. In other possible embodiments shown in FIGS. 7 and 12, however, the inlet end openings 54 of the air inlet ducts may be at the same elevation and spacing D1 above the concrete support pad CP.

The outlet end openings 55 of the cooling air inlet ducts 50 are preferably located in the inner shell 23 adjacent to the top surface 27-1 of baseplate 27. This introduces cooling air radially into the lowermost part of the module cavity 26 and ventilation annulus 31 to maximize cooling efficiency and heat removal from the canister 29.

In one non-limiting embodiment as illustrated, the air inlet ducts 50 may have a mitered construction formed of sections of ducting seal welded together at joints formed between the inlet, outlet, and intermediate sections 51-53 of the ducts. The ducts may be formed a suitable metal such as steel (e.g. carbon or stainless) in one embodiment. The inlet ducts 50 emulate the shape of a periscope with the angles of the mitered sections selected as needed for installation and neutron streaming blocking.

It bears noting that the seal welding mentioned herein refers to continuous welds that form hermetically sealed joints that are water and gas/air tight.

The welded mitered joints of the mitered duct 50 allows radiation attenuation shields 50-1 to be placed transversely in the ducts to the air flow direction at the joints to enhance neutron streaming blocking (see, e.g. FIGS. 3 and 5). In one embodiment, perforated steel plates 56 may be used for shields 50-1 at least at the mitered joint between the inlet and intermediate sections 51, 53 of each mitered joint. In other embodiments, a shield 50-1 may be also be disposed at the joint between the intermediate and outlet sections 53, 52 of the ducts 50 (e.g. two total at the joints between the intermediate section 53 and adjoining inlet and outlet sections 51, 52). The perforations allow cooling air to flow through neutron blocking plates, but reduces neutron streaming. In other embodiments, external radiation shields 80 may also be attached to the exterior of the inlet air ducts 50 (see, e.g. FIG. 5) which are further described herein.

In other constructions contemplated, the inlet ducts 50 may have the same design described above but can be formed by a single monolithic unitary tube of rectilinear cross-sectional shape hot bent to shape with curvilinear bends formed between the intermediate section 53 and adjoining inlet and outlet sections 51, 52. In such a case only the inlet and outlet end openings 54, 55 of each duct 50 is seal welded to the outer and inner shells 24, 23, respectively. In such a construction, the external radiation attenuation shields 80 may be used with the ducts.

FIGS. 14-17 depict an alternative configuration of a mitered and welded cooling air inlet duct 50". In this embodiment, the upwardly angled inlet section 51 described above is eliminated. Air inlet duct 50" includes obliquely/downwardly angled intermediate section 53" and obliquely/downwardly angled outlet section 52". Outlet section 52" is oriented at a different oblique angle to longitudinal axis LA and baseplate 27 of module 20 than intermediate section 53". As one non-limiting illustrative example, outlet section 52" may be disposed at an oblique angle of about 30 degrees to the horizontal baseplate 27 and intermediate section 53" may be oriented at an oblique angle of 45 degrees or greater, such as about 70 degrees in one configuration. Other oblique angles may be sued. Because previous inlet section 51 shown in FIGS. 3 and 5 previously described herein is eliminated, intermediate section 53" may be considered to serve as the inlet section of the alternative duct 50". The outer end of intermediate duct section 53" defines the exterior inlet end opening 54" and the inner end of outlet duct section 52" defines the interior outlet end openings 55" of the duct. Duct 50" may similarly be formed of steel or another metal.

Both mitered inlet air ducts 50" (FIGS. 14-17) and 50 (see, e.g. FIG. 3) may further each include a radiation attenuation shield 80 which is attached to the exterior of each of the ducts, such as via welding, fasteners, or other methods. The shield members may be attached to the top surface of the roof wall of the ducts in one embodiment as illustrated. Radiation shields 80 are complementary configured to ducts 50/50" and include two obliquely orientated sections as shown to match the angled sections of the mitered ducts. The shields 80 have a multi-angled plate-like body which extends radially through module sidewall 77 from proximate to the outer shell 24 adjacent to inlet vent shield covers 54-1 to the inner shell 23 thereby shielding and covering substantially the entirety of the top of each inlet duct 50/50". The shields may have a lateral width approximately as wide as the ducts 50/50" and length substantially coextensive with the radial length of the ducts. In one embodiment, shields 80 may be formed of steel plate; however other metallic materials including boron-containing materials may be used.

The inlet end openings 54" of each mitered duct 50" or 50 may be fitted with a perforated radiation attenuating inlet vent shield cover 54-1 which is attached to the outer shell 24 of module 20 at each air inlet opening. Welding or fasteners may be used to secure the covers to the shell 24. The shield covers 54-1 have a configuration and sufficient thickness to a serve as both effective attenuation of radiation emitted through the ducts and to minimize the ingress of ambient rainwater while allowing cooling air to enter the ducts. Each cover 54-1 is thus a relatively thick structure in one (e.g. about 2 inches thick) which includes a plurality of through bores or perforations 54-2. In one embodiment, the covers 54-1 may be made of steel; however, other metallic materials including those containing boron may be used. The perforations are obliquely angled in orientation relative to longitudinal axis LA of module 20 such that their outer ends are lower than their inner ends to preclude the entrance of rain and to eliminate any straight line of sight through the perforations from end to end to prevent neutron streaming.

Figure 6:
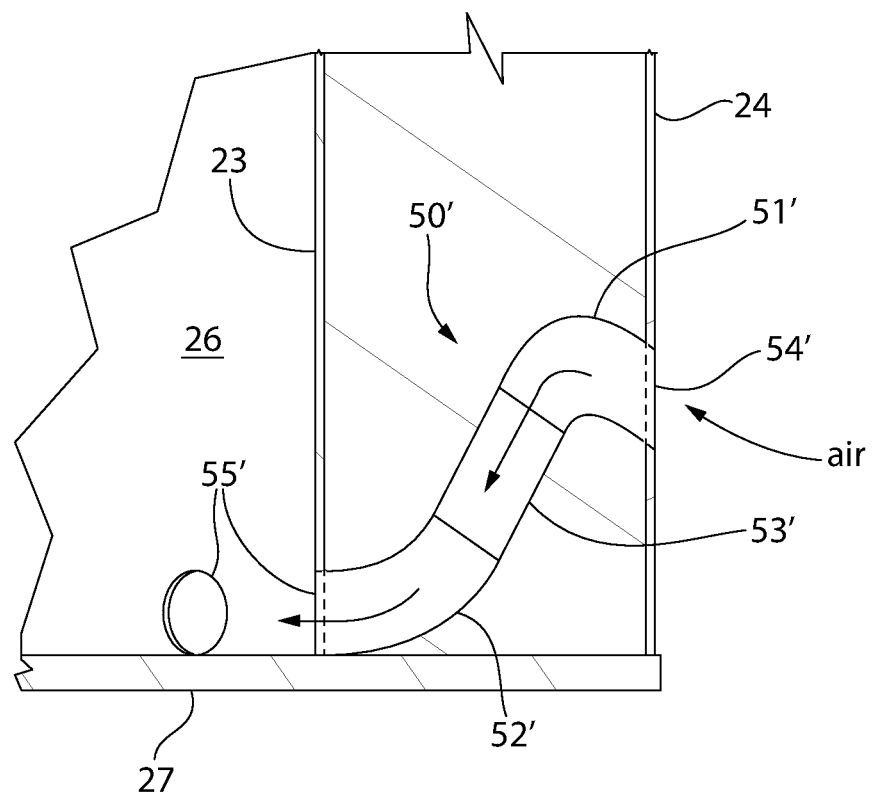
FIG. 6 is a side view of a first alternative air inlet duct construction utilizing circular cross section flow conduits.
Figure 7:
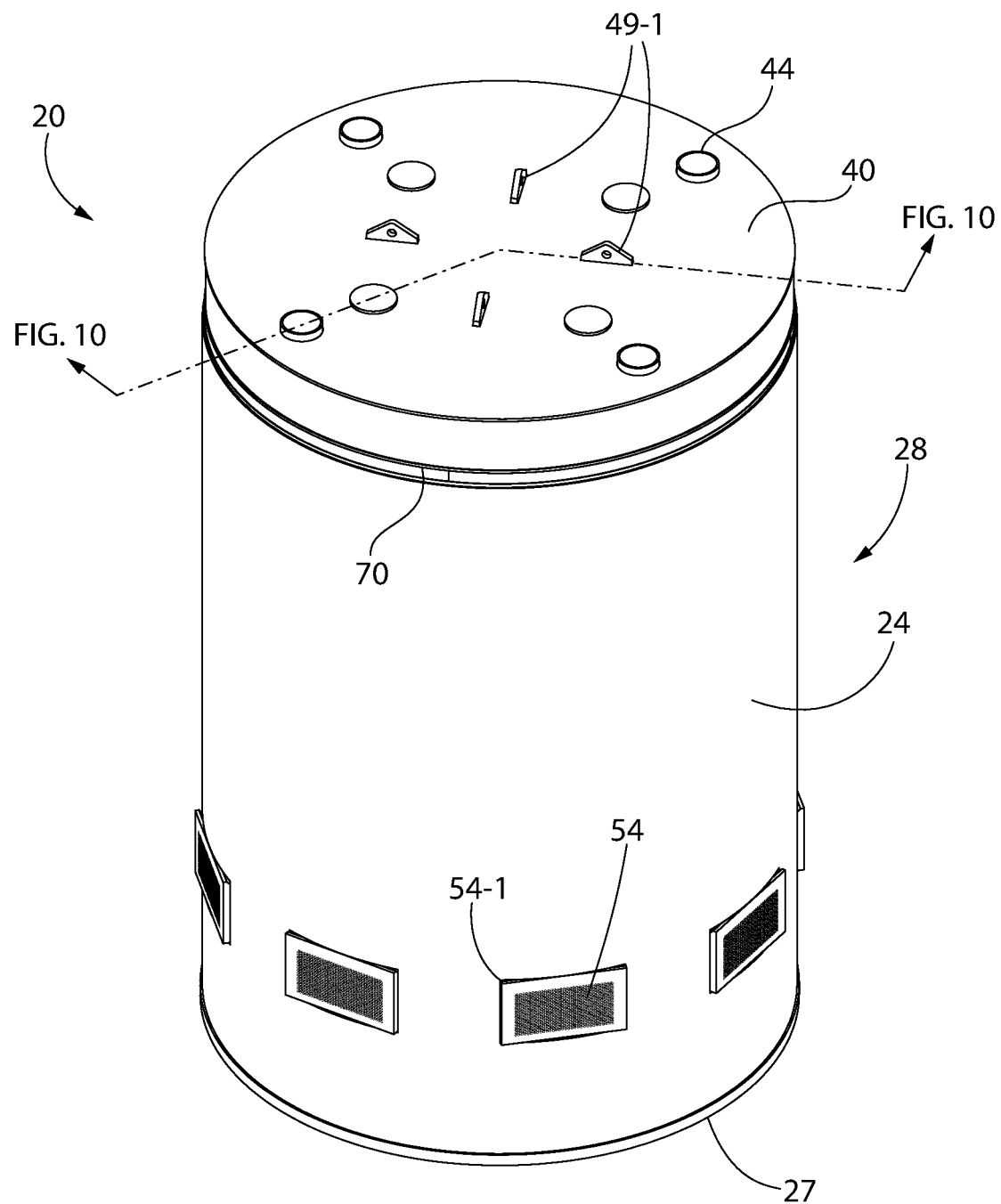
FIG. 7 is a perspective view of the ventilated module of FIG. 1 having a second alternative air inlet duct construction and layout.
Figure 8:
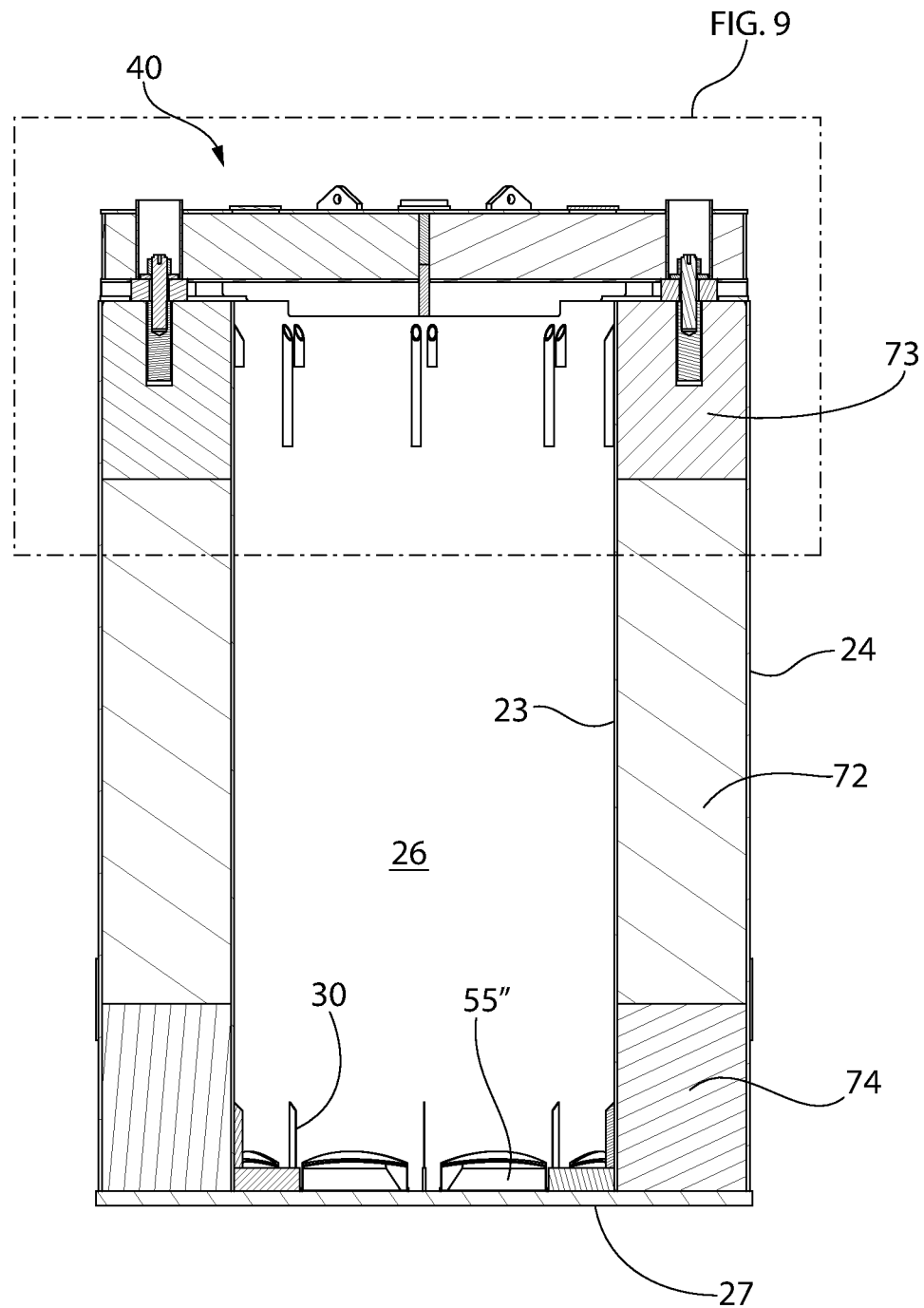
FIG. 8 is a first side cross-sectional view thereof.
Figure 9:
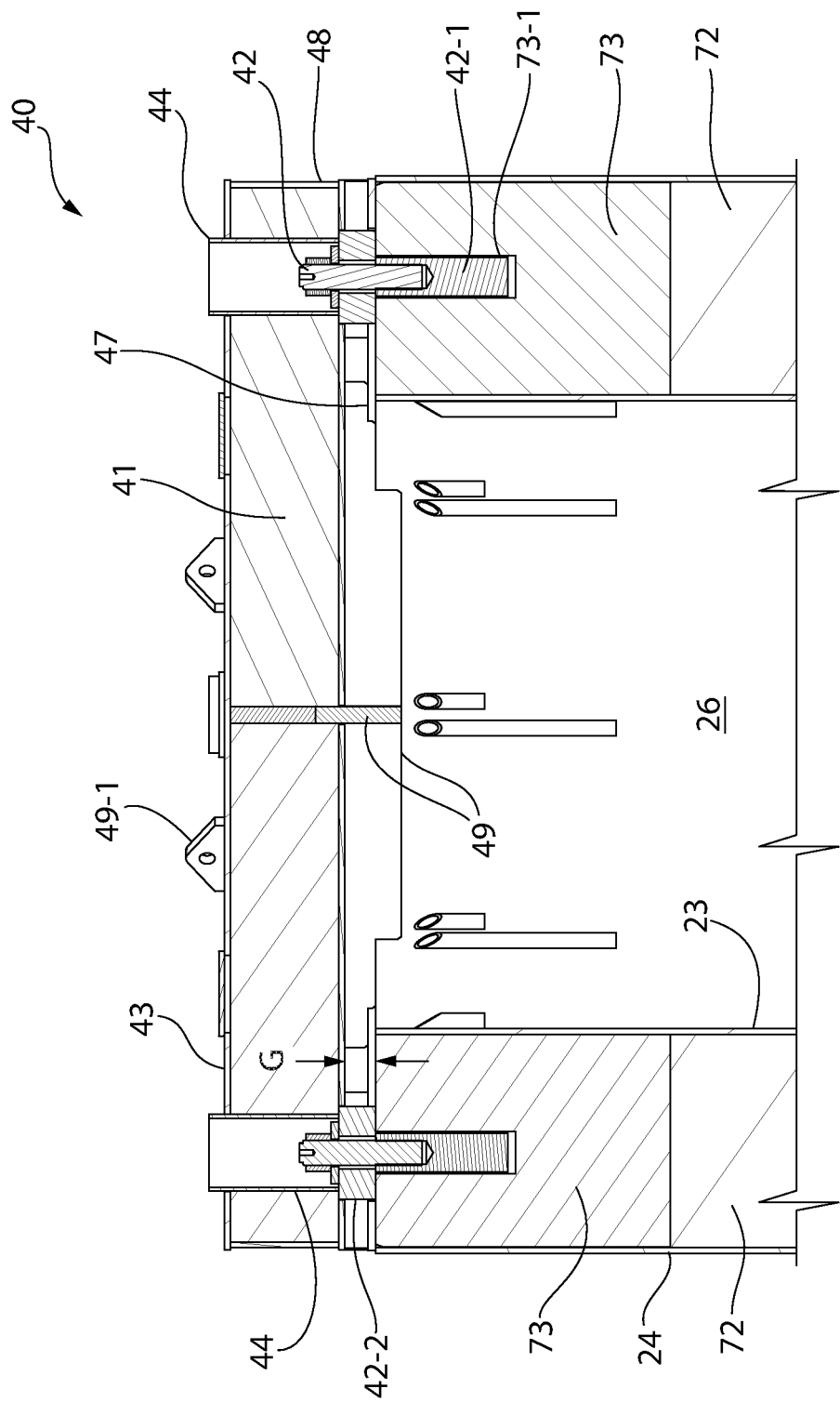
FIG. 9 is an enlarged detail taken from FIG. 8.
Figure 10:
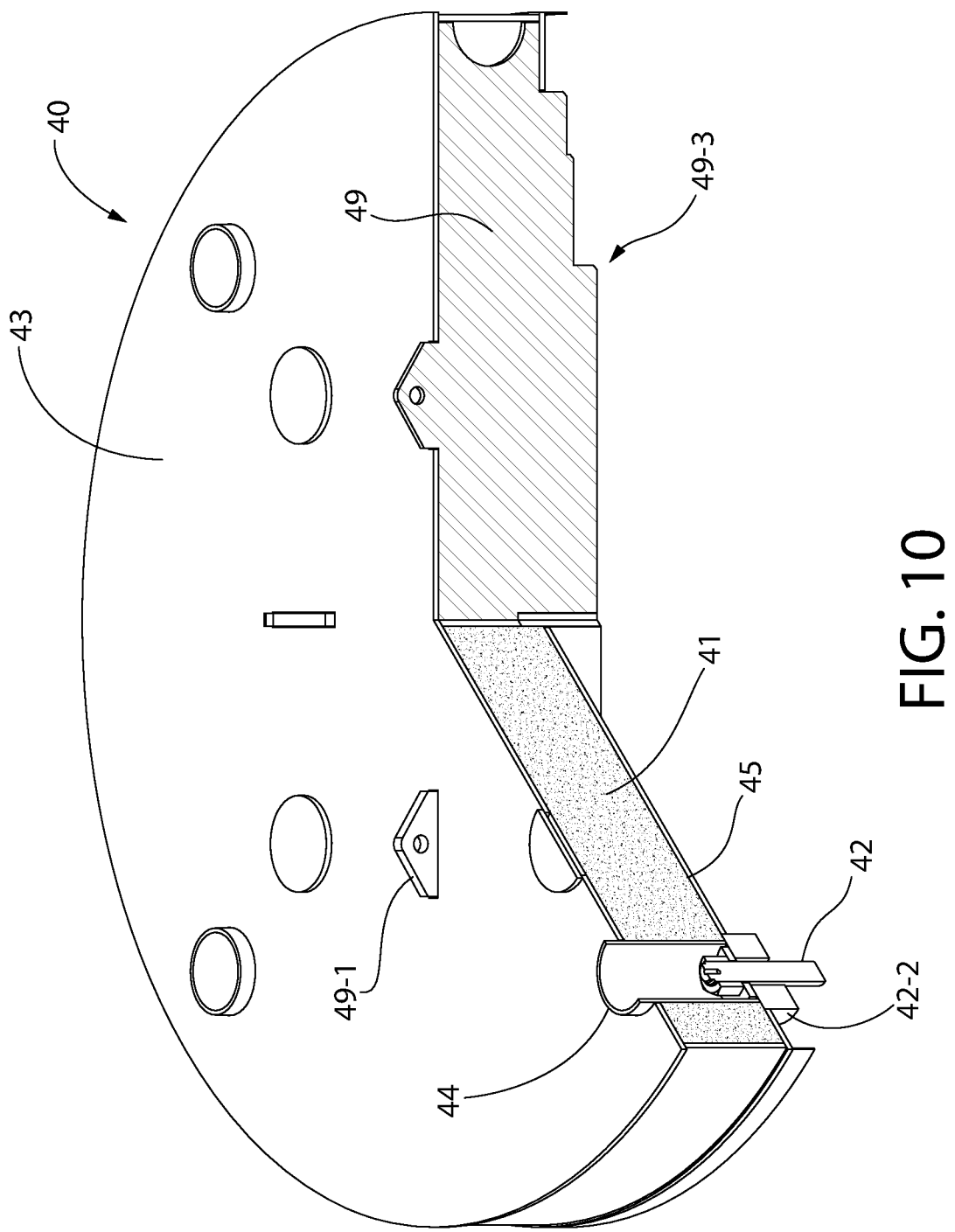
FIG. 10 is a perspective cross-sectional view of the lid of the module of FIGS. 1 and 7.
Figure 11:
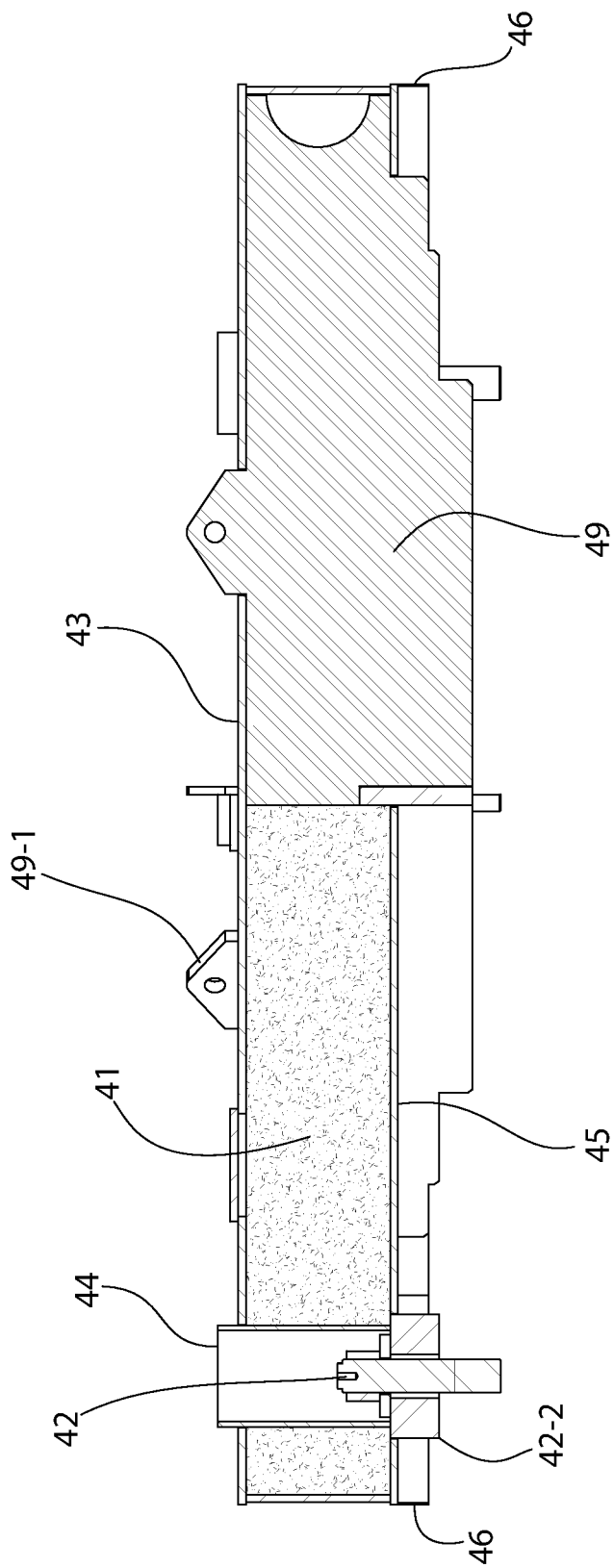
FIG. 11 is the side cross-sectional view thereof.

In yet other possible constructions, alternative cooling air inlet ducts 50' shown in FIG. 6 may be provided which are formed instead of circular flow conduits. Alternative circular ducts 50' may be formed from standardly available sections of metal piping (e.g. steel) of circular cross section which are seal welded together to emulate the same general periscopic shape as inlet air ducts 50 previously described herein. For example, inlet section 51' may be formed by a 60 degree long radius elbow, outlet section 52' may be formed by a 45 degree long radius elbow, and intermediate section 53' be formed by a straight pipe section. The same angular orientations of these different sections may be the same as their counterparts in rectilinear air inlet duct 50 previously described herein. In some variations, the piping air inlet duct 50' may be formed from three straight sections of circular piping which are cut to form miter joints between the different sections 51', 52', and 53'. In yet another variation, the piping air inlet duct 50' may instead be formed by a single monolithic unitary section of piping of circular cross-sectional shape hot bent to shape with curvilinear bends between the intermediate section 53' and adjoining inlet and outlet sections 51', 52'. The arrangement of any of the foregoing piping structures in relation to the lower section of storage module 20 may be the same as rectilinear air inlet duct 50 previously described herein (see, e.g. FIG. 3). Accordingly, the air inlet and outlet end openings 54', 55' of the duct 50' may be at identical locations to the inlet and outlet end openings of the rectilinear air inlet duct 50.

In operation, ambient cooling flows generally inwards 360 degrees around module 20 in all directions into the inlet ducts. The cooling air then flows in a generally downward direction in each air inlet duct 50 traversing the full radial extent or thickness of the cask's sidewall 77 before entering module cavity 26 near the bottom of the ventilation annulus 31. Thus, while the cooing air enters the module 20 well above its bottom to prevent the ingress of floodwater via the outer inlet end openings 54 of the inlet ducts 50 through the outer shell 24, the full benefit of the maximum vertical distance available within the cavity 26 between the top and bottom vents for cooling the nuclear fuel-bearing canister 29 is advantageously maintained. After the cooling air enters the bottom of the ventilation annulus 31 inside module 20, the air is heated by the canister 29 and flows vertically upwards in the annulus from the air inlet ducts 50 to the air outlet ducts 70 at the top of cavity 26. The heated cooling air is then discharge radially outwards from the module 20 in all directions 360 degrees around the module.

It bears noting that an advantageous aspect of any of the foregoing inlet air ducts having a majority of their radial length obliquely angled in a downward direction toward the cavity 26 of the storage module 20 will act to drain any water or rain entering module into the bottom of the cavity. At this location in the cavity, the water will be exposed to the heat emitted from the canister and evaporated. The present obliquely angled duct arrangements thus effectively eliminate any horizontal portions of ducting of any substantially length where water might accumulate and accelerate corrosion of the ducting.

According to another aspect of the invention, the inner and outer shells 23, 24 of the main body of the module 20 may be structurally tied and joined together via a pair of welded rigid radial shell interconnector plates 73, 74. Upper interconnector plates 73 are located at the top end 21 of the module. Lower interconnector plates 74 are located at the bottom end 22 of the module. The two interconnector plates in turn are spaced vertically apart from each other as shown. The interconnector plates 73, 74 extend radially from the inner shell 23 to the outer shell 24 of module 20 and are welded at each of their ends to each shell. Each interconnector plate 73, 74 has opposing inner and outer vertical edges welded to the inner and outer shells 23, 24, respectively. The interconnector plates 73, 74 each have a height less than the height of the module, and preferably less than half the height of the module (see, e.g. FIGS. 3 and 8). In one embodiment, the radial interconnector plates may each have a flat, vertically oriented body which is perpendicularly and radially oriented relative to the inner and outer shells 23, 24. In other embodiments, the radial interconnector plates can be slightly oblique in angular orientation to the shells if desired. Four interconnector plates 73, 74 evenly spaced circumferentially apart may be provided in one embodiment as shown; however, other embodiments may have more or less plates. The interconnector plates 73, 74 may be formed of steel (e.g. carbon or stainless) in one embodiment. A representative thickness of plates 73, 74 is about 1 inch in one non-limiting embodiment.

The upper interconnector plates 73 serve dual important functions. First, similarly to lower interconnector plates 74, the upper interconnector plates 73 rigidly reinforce the module structure. Secondly, the upper interconnector plates further function as the lifting points for the module to transfer the weight of the entire module (with SNF canister inside) to the closure fasteners 42 and lifting beams 49 in the lid 40 to the crane or hoist. The dead load of the module is thus transferred through the skeleton of the module 20 formed by the weldment of the metallic inner and outer shells 23, 24, lower interconnectors 74, and baseplate 27 to the upper interconnector plates 73 where it is picked up by the bolting.

The combination of the weld joined shells 23, 24, interconnector plates 73, 74 and a thick rigid baseplate 27 provide a strong rigid structural weldment which support as dense a concrete fill or liner 72 (serving as radiation shielding material) in the sidewall 77 of module 20 particularly when lifted as a unit. Concrete fill weighing as much as 250 pcf (pounds per cubic foot) density are typically employed to maximize blockage of radiation. This rigid structural shell assembly ensures that the base plate 27 which bears the entire dead load of the concrete liner, shells, and lid 40 does not deform when lifted off the concrete support pad CP by a hoist or crawler crane.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A passively cooled storage module for spent nuclear fuel comprising:
an elongated module body defining a top end, a bottom end, a sidewall, and an internal cavity extending between the ends along a longitudinal axis, the internal cavity being configured for holding a fuel storage canister;
a plurality of cooling air inlet ducts spaced circumferentially apart around the body, the inlet ducts each forming a radially oriented air inlet passageway fluidly connecting ambient atmosphere with the internal cavity;
each air inlet duct having an inlet end opening at an exterior surface of the sidewall and an outlet end opening at an interior surface of the sidewall adjoining the cavity;
wherein the air inlet ducts each have a recurving configuration to draw cooling air radially inwards and initially upwards from ambient atmosphere, and then redirect the cooling air downwards through the air inlet duct into a lower part of the internal cavity of the module.

2. The module according to claim 1, wherein the inlet end openings of the air inlet ducts are located at a higher elevation than the outlet end openings.

3. The module according to claim 2, wherein the inlet end openings are located on a lower half of the module and spaced vertically apart from a baseplate affixed to the bottom end of the module by a distance of at least two feet.

4. The module according to claim 3, wherein the inlet end openings of each inlet air duct are located on the lower portion of the module at 25 percent or less than the height of the module.

5. The module according to claim 4, wherein the inlet end openings have a vertically staggered arrangement in which the elevation of the inlet end opening of each air inlet duct is at a different elevation than the inlet end opening of each adjacent inlet air duct.

6. The module according to claim 5, wherein the inlet end openings of the air inlet ducts are radially open directly to ambient atmosphere.

7. The module according to claim 6, wherein the air inlet ducts are formed of piping having a circular cross-sectional shape.

8. The module according to claim 2, wherein the outlet end openings of the air inlet ducts are arranged to discharge cooling air into the lowest-most part of the internal cavity through the sidewall and adjacent to a top surface of a baseplate attached to the bottom end of the module.

9. The module according to claim 8, wherein the outlet end openings of the air inlet ducts are disposed adjacent to the top surface of the base plate.

10. The module according to claim 9, further comprising a plurality of L-shaped support brackets mounted on the base plate, the support brackets being configured to both elevate the canister above the baseplate and center the canister radially in the internal cavity of the module to form a ventilation annulus between the canister and body of the module, and wherein the cooling air is radially discharged from each air inlet duct into a bottom of the annulus via the outlet end openings of the air inlet ducts and flows upwards alongside the canister in the annulus for dissipating heat emitted by the canister.

11. The module according to claim 2, wherein the module body further comprises a sidewall having a composite construction comprised of an inner shell, an outer shell, and a concrete liner disposed between the shells for radiation shielding.

12. The module according to claim 11, wherein each air inlet duct is embedded in the concrete liner.

13. The module according to claim 12, wherein the inner and outer shells of the module body are structurally tied together via a plurality of vertically oriented upper and lower radial shell interconnector plates welded to the shells and embedded in the concrete liner.

14. The module according to claim 2, wherein the air inlet ducts each have a mitered multi-angled configuration comprising a first linear section adjoining the inlet end opening and a second linear section adjoining the first linear section at a miter joint, the first and second linear sections being obliquely angled to each other and the longitudinal axis of the module.

15. The module according to claim 14, further comprising a perforated radiation shield disposed at the miter joint and oriented transversely the first and second linear sections.

16. The module according to claim 1, wherein each air inlet duct comprises an inlet section adjoining to the exterior inlet end opening which is obliquely angled in an upwards direction to the longitudinal axis of the module, an outlet section adjoining the outlet end opening, and an intermediate section extending between the inlet and outlet sections.

17. The module according to claim 1, wherein each inlet duct includes a radiation shielding member abuttingly attached to a top of the inlet duct, the radiation shielding member being configured to conform to the inlet duct.

18. The module according to claim 1, further comprising a lid detachably coupled to the top end of the module for enclosing the internal cavity, the lid being configured to form air outlet ducts at an interface between the lid and top end of the module oriented to radially discharge heated cooling air from the internal cavity of the module outwards to atmosphere.

19. A ventilated dry storage system for passive cooling of spent nuclear fuel, the system comprising:
- an elongated module defining a top end, a bottom end, and a sidewall extending between the ends defining an internal cavity extending along a longitudinal axis;
- the sidewall including an inner shell, an outer shell, a radiation shielding fill material disposed between the shells;
- a plurality of radially oriented interconnector plates embedded in the fill material and welded to the inner and outer shells to rigidly couple shells together;
- a base plate sealingly affixed to the bottom end of the module;
- a removable lid detachably coupled to the top end of the module;
- a fuel storage canister disposed in the internal cavity and containing heat-emitting spent nuclear fuel;
- a plurality of cooling air inlet ducts each forming a radially oriented air inlet passageway through the fill material of the module and configured to fluidly connect ambient atmosphere with the internal cavity;
- wherein each of the interconnector plates are disposed between adjacent ones of the air inlet ducts.

* * * * *